United States Patent
Shitara

[19]

[11] Patent Number: 5,877,913

[45] Date of Patent: *Mar. 2, 1999

[54] ROTATION SYNCHRONOUS CONTROL SYSTEM

[75] Inventor: Masataka Shitara, Kawasaki, Japan

[73] Assignee: Fujitsu Limited, Kawasaki, Japan

[*] Notice: The term of this patent shall not extend beyond the expiration date of Pat. No. 5,657,177.

[21] Appl. No.: 749,411

[22] Filed: Nov. 15, 1996

Related U.S. Application Data

[62] Division of Ser. No. 337,968, Nov. 14, 1994, Pat. No. 5,657,177, which is a continuation of Ser. No. 970,006, Nov. 2, 1992, abandoned.

[30] Foreign Application Priority Data

Nov. 1, 1991 [JP] Japan ................................. 03/287,764

[51] Int. Cl.⁶ .................................................. G11B 27/22
[52] U.S. Cl. ........................................... 360/73.02; 318/85
[58] Field of Search ............................... 360/73.02, 73.03; 318/85

[56] References Cited

U.S. PATENT DOCUMENTS

| | | |
|---|---|---|
| 4,117,422 | 9/1978 | Hunt . |
| 4,618,897 | 10/1986 | Johnson et al. .................. 360/73.03 X |
| 4,890,045 | 12/1989 | Ishizuka ........................... 360/73.02 X |
| 4,907,105 | 3/1990 | Kurzweil, Jr. ...................... 360/73.02 |
| 4,918,544 | 4/1990 | Ishizuka et al. ................. 360/73.03 X |
| 5,051,850 | 9/1991 | Takahashi ........................ 360/73.02 X |
| 5,159,503 | 10/1992 | Mitamura et al. ................... 360/73.02 |
| 5,216,654 | 6/1993 | Itoh et al. ........................ 360/73.02 X |
| 5,276,569 | 1/1994 | Even . |
| 5,303,097 | 4/1994 | Baba et al. ........................... 360/73.02 |
| 5,657,177 | 8/1997 | Shitara ................................ 360/73.03 |

FOREIGN PATENT DOCUMENTS

| | | |
|---|---|---|
| 320107A3 | 11/1988 | European Pat. Off. . |
| 540354A2 | 5/1993 | European Pat. Off. . |
| 60-236162 | 11/1985 | Japan . |
| 62-245567 | 10/1987 | Japan . |
| 142060 | 2/1989 | Japan . |
| 6442060 | 2/1989 | Japan . |
| 2290187 | 11/1990 | Japan . |
| 312065 | 1/1991 | Japan . |
| 453060 | 2/1992 | Japan . |
| WO9001737 | 2/1990 | WIPO . |

OTHER PUBLICATIONS

"Method to Synchronize Direct Access Storage Device Spindles Using Off–The–Shelf Hardware and Digital Control Techniques" pp. 356–358, IBM Technical Disclosure Bulletin, vol. 33, No. 4, Sep. 1990.

Dual–Motor Speed and Syn Control System Sep. 19, 1975, pp. 1106–1107, IBM Technical Disclosure Bulleting, Vo. 18, No. 4.

*Primary Examiner*—Aristotelis M. Psitos
*Assistant Examiner*—James L. Habermehl
*Attorney, Agent, or Firm*—Greer, Burns & Crain, Ltd.

[57] ABSTRACT

In a rotation synchronous control system comprising a host controller and a plurality of units connected to the host controller, each of the plurality of units having a rotation device, the system having a spindle sync function for the rotation devices to maintain a spindle sync between them, each of the units is provided with a spindle sync/reference signal source and a phase adjuster. The controller monitors the spindle sync between the units and issues a phase correction instruction to each of the units. Receiving the instruction, the phase adjuster in each unit adjusts the phase of the sync signal and uses the sync signal thus corrected to provide a spindle sync control.

6 Claims, 26 Drawing Sheets

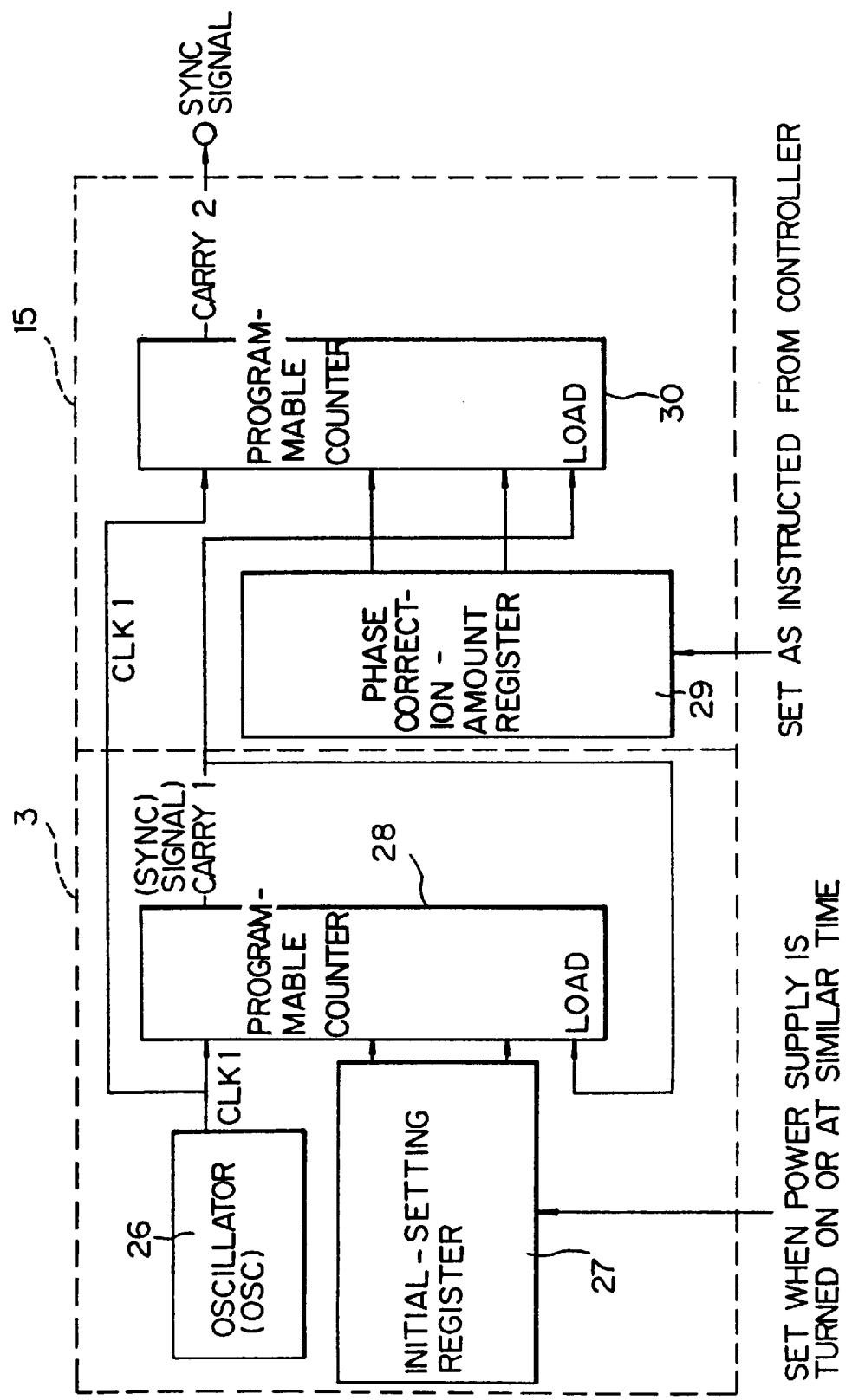

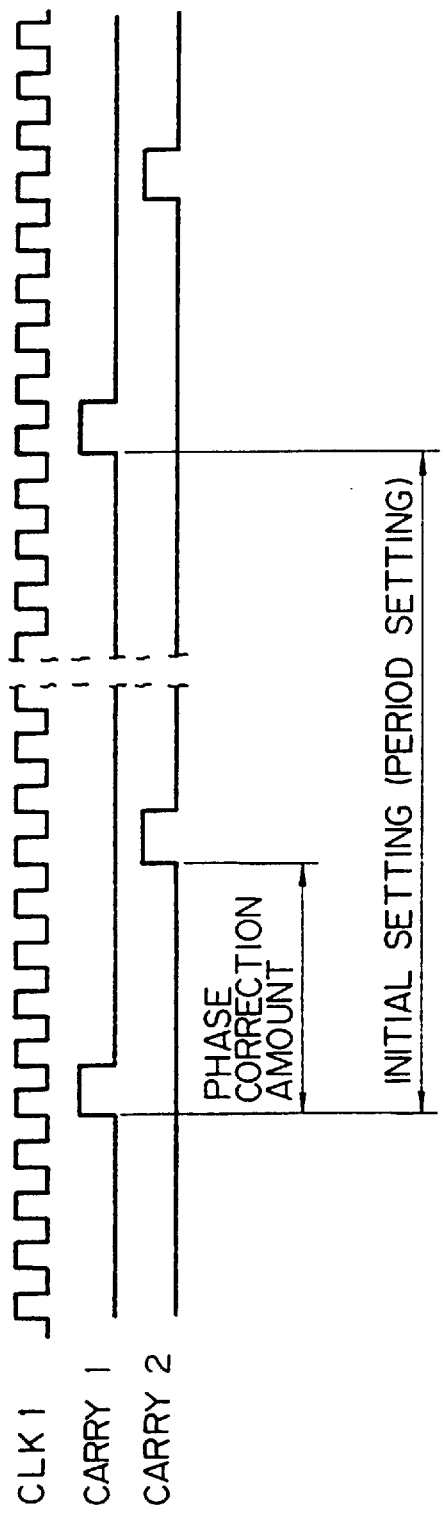

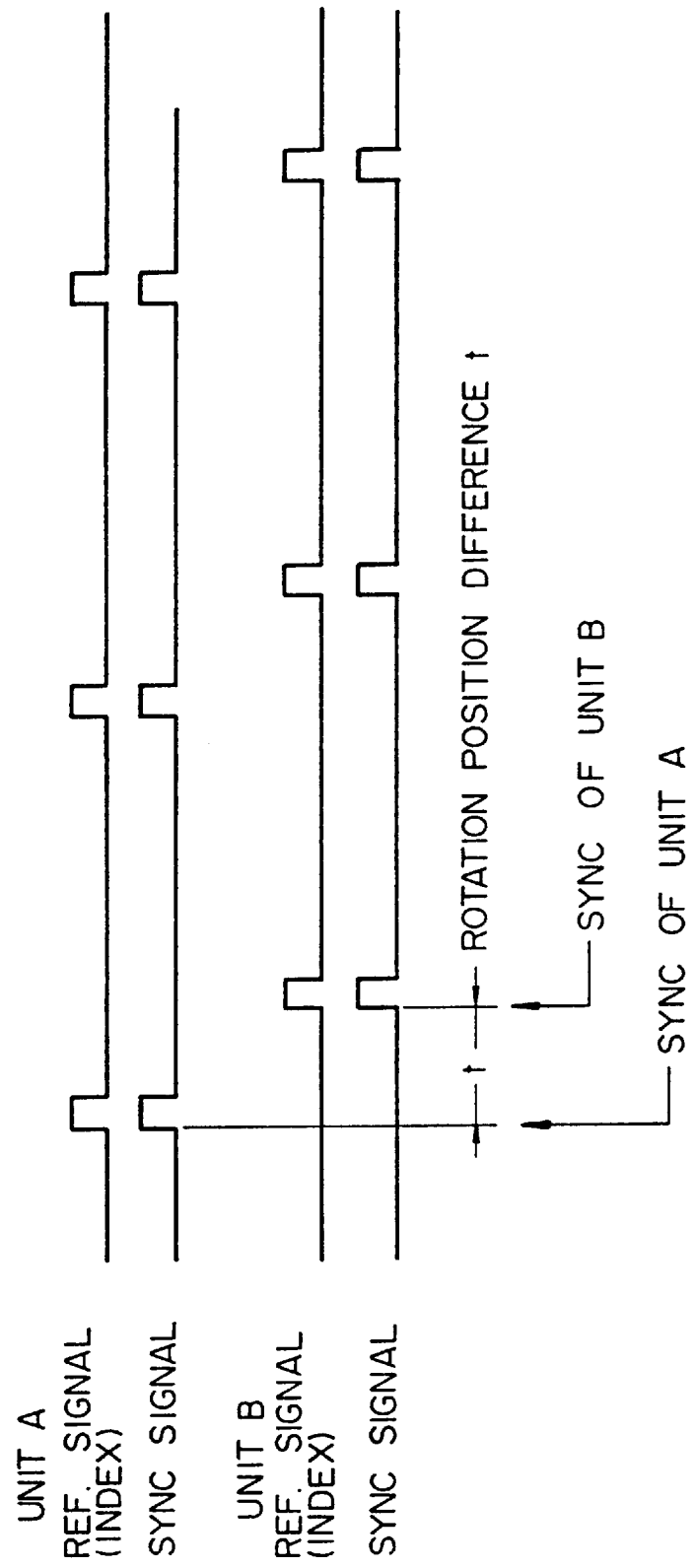

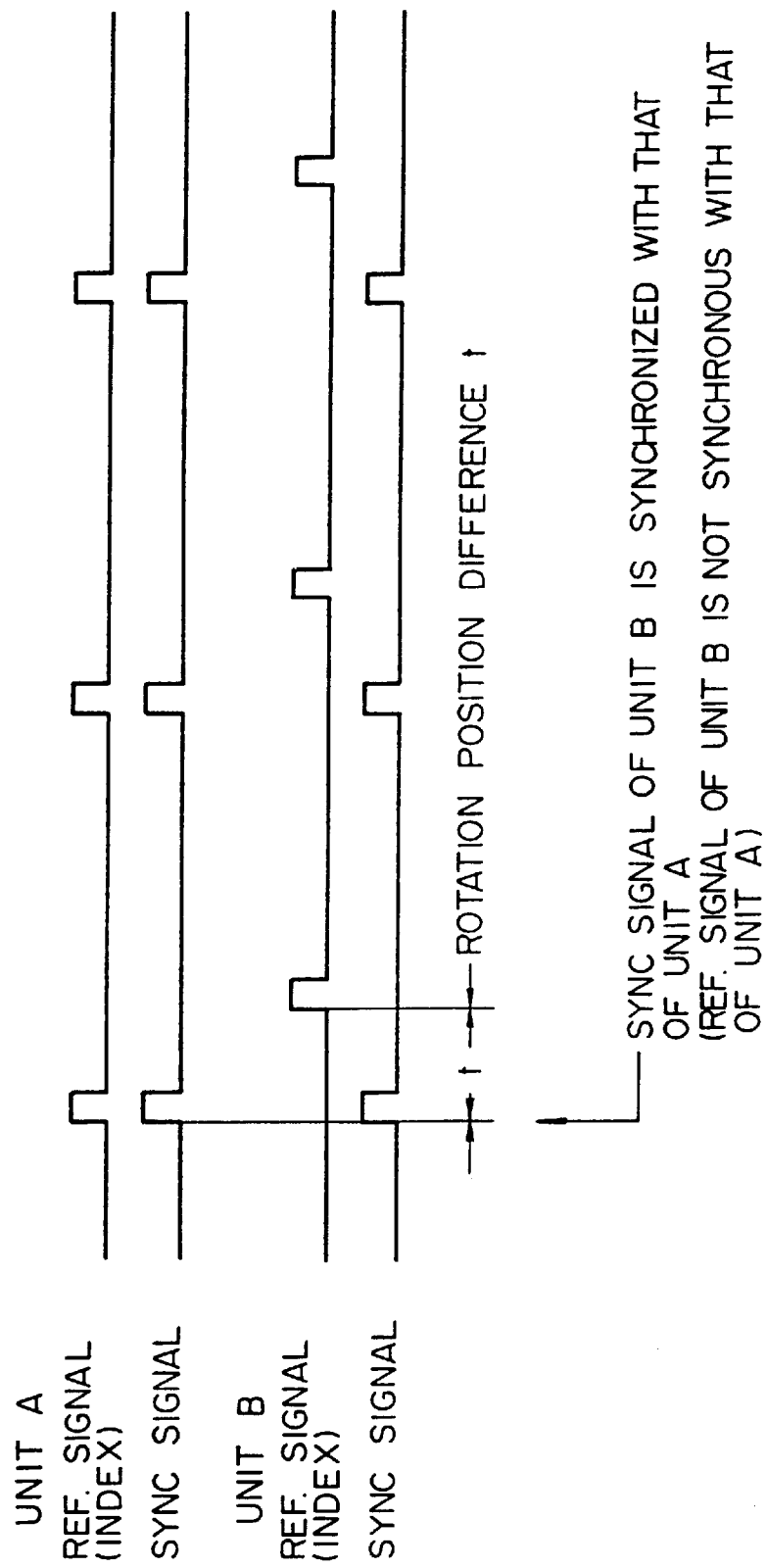

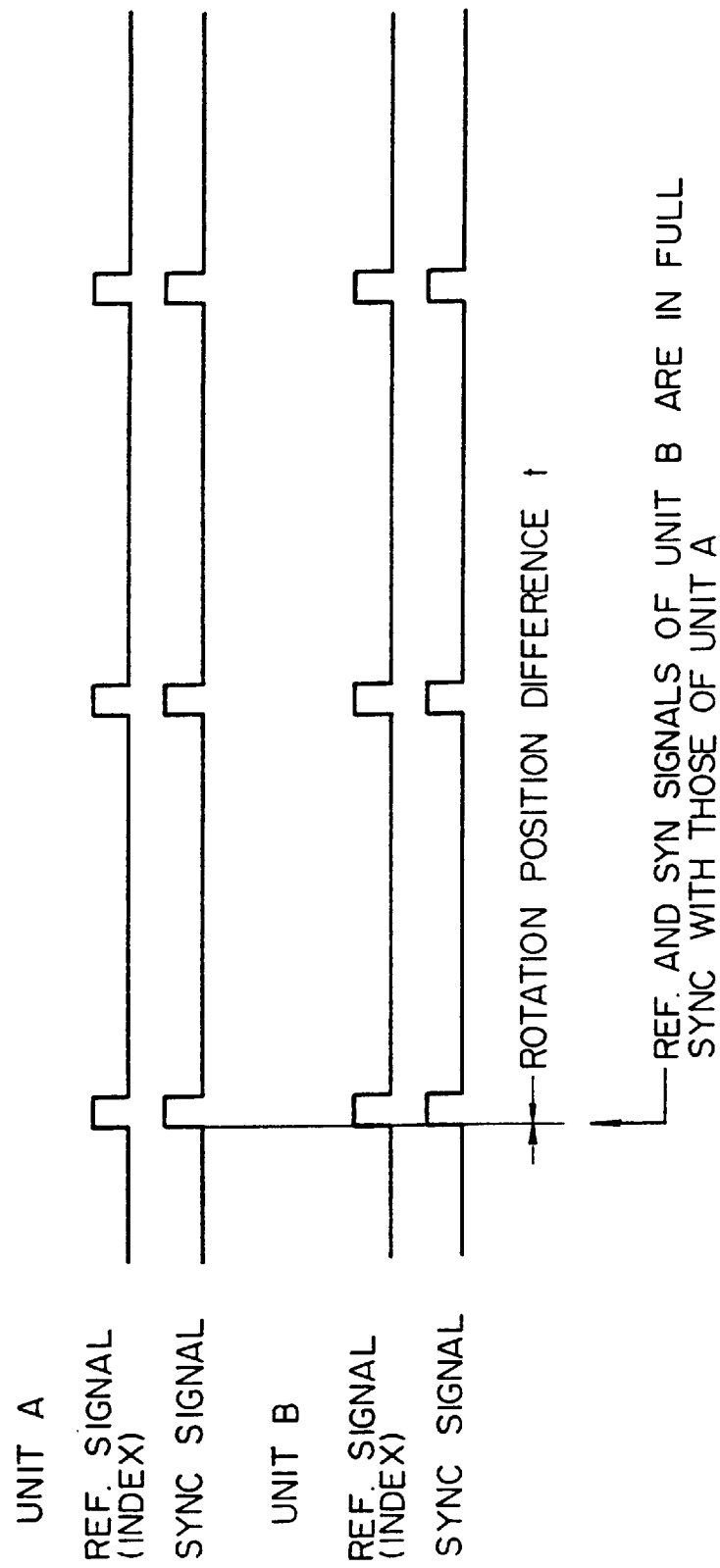

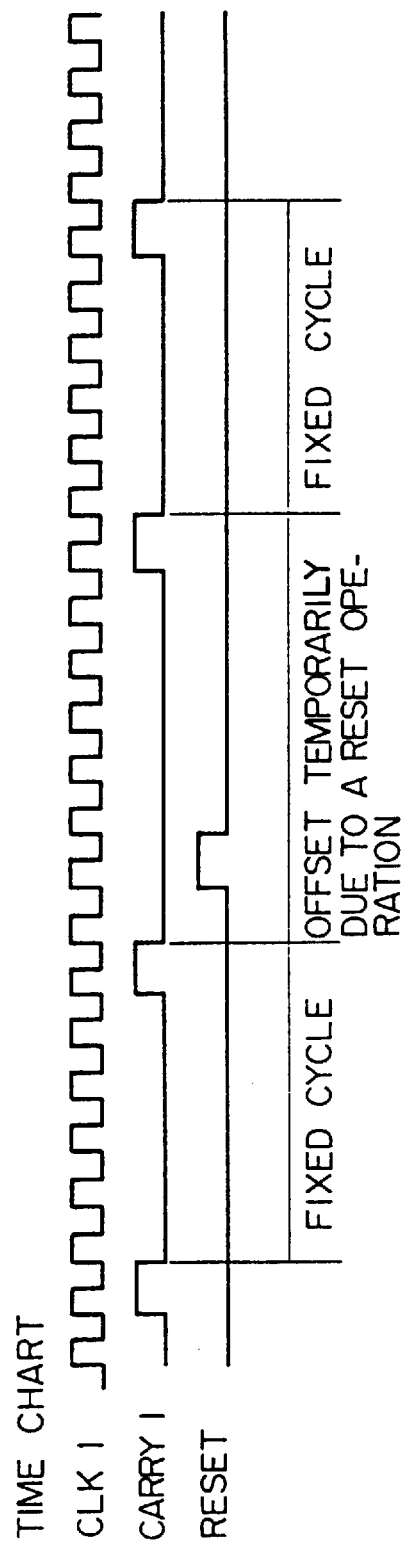

5,877,913

ROTATION SYNCHRONOUS CONTROL SYSTEM

This is a divisional of application Ser. No. 08/337,968 filed on Nov. 14, 1994, now U.S. Pat. No. 5,657,177, which is a continuation of Ser. No. 07/970,006 filed Nov. 2, 1992, now abandoned.

BACKGROUND OF THE INVENTION

1. Field of the Invention

The present invention relates to a rotation synchronous control system for use in controlling magnetic disk drives for the purpose of magnetic disk drives for the purpose of, for example, operating the spindle motors of a plurality of magnetic disk drives, which are called a array drive, synchronously in rotation with each other.

A recent tendency for demanding, in a computer system, a transfer of large amount of data at high speed, and therefore, storage drives such as magnetic disk drives also require a transfer of large of amount of data of high speed which communicate data with a host computer.

2. Description of the Related Art

In general, in a single unit of a magnetic disk drive, a data transfer speed is limited by a rotation speed of a motor which rotates a magnetic disk as a record medium. Accordingly, if it is intended to attain a high speed operation by increasing a data transfer speed, it is necessary to perform a read/write operation by driving a plurality of disk drives, called a disk array drive, simultaneously and in parallel. At this time, according to a command from a host computer, the spindle motors of the magnetic disk drives are synchronously rotated in parallel, so that it becomes possible to perform a parallel transfer of data.

The present invention refers to a strategy for realizing high speed data transfer by accurately executing a rotation synchronous function, which is called spindle sync, in such array drive, etc.

FIG. 1 is a block diagram of a prior-art array disk system. In FIG. 1, the reference numeral 1 denotes a controller (host unit), 2 a magnetic disk drive, 3 a spindle sync/reference signal source (oscillator), 4 a sync control, 5 a rotation device, 6 an interface control, 7 a rotation reference position detection control, 8 a receiver (RV), and 9 through 11 connectors (CN).

One of the systems in which a plurality of magnetic disk units is operated synchronously in rotation with each other is already known as a "disk array drive". In this disk array drive, a plurality of magnetic disks are connected to a controller so that they are operated in parallel, data is transferred between them, simultaneously thereby attaining a high speed data transfer.

Also in the disk array drive, a spindle sync (rotation synchronous control) function is provided for the plurality of magnetic disk drives to maintain the spindle sync between the rotation of the devices so that the magnetic disk drives operate as if they were a single unit.

The disk array drive is configured as shown in FIG. 1, for example. As shown in FIG. 1, a plurality of magnetic disk drives 2 are connected to the controller 1 and a spindle sync/reference signal source (oscillator) 3 is connected to each of the magnetic disk drives 2. FIG. 1 shows two magnetic disk drives as indicated with "Unit A" and "Unit B", respectively, but more than two disk drives may be connected to the controller 1 in practice.

Each of the magnetic disk drives 2 is provided with a sync control 4, rotation device 5, interface control 6, rotation reference position detection control 7, and receiver (RV) 8. Each magnetic disk drive 2 is connected to the controller 1 by connecting an interface cable (I/F CABLE) 13 between the connector 9 of each magnetic disk drive 2 and the connector (not shown) of the controller 1.

Also each magnetic disk drive 2 and the spindle sync/reference signal source 3 are connected to each other by connecting a sync signal cable 14 to the connector 10 of each magnetic disk drive 2 and connector 11 of the spindle sync/reference signal source 3. Thus, each magnetic disk drive 2 can be supplied with a spindle sync/reference signal (it will be referred to as "sync signal" hereafter and will be illustrated as "SYNC" in FIG. 1, etc.) from the spindle sync/reference signal source 3.

The rotation device 5 includes a magnetic disk, a spindle motor for driving the rotation of the magnetic disk, etc. and has a magnetic head 12 provided near the rotation device 12. The rotation reference position detection control 7 is provided to detect a rotation reference position signal from the rotation device 5. For instance, it generates a reference signal (e.g., index signal (INDEX)) based on a rotation position (HEAD POSITION) signal read through the magnetic head 12.

The sync control 4 receives a control signal (SC) from the interface control 6, a reference signal (INDEX) from the rotation reference position detection control 7, and a sync signal (SYN) from the spindle sync/reference signal source 3. The sync control 4 controls the rotation device 5 and causes the spindle motor of the rotation device to rotate synchronously with the sync signal.

During operation of the disk array drive thus arranged, the spindle motor of the rotation device 5 is subject to spindle sync control based on the instruction from the controller 1. In this case, the spindle sync/reference signal source 3 supplies a sync signal to each of the magnetic disk drives 2.

In each magnetic disk drive 2, the receiver 8 receives the sync signal through the connector 10 and then supplies it to the sync control 4 which in turn controls the spindle motor of the rotation device 5 such that the spindle motor rotates synchronously with the sync signal.

Thus the rotation devices 5 of the plurality of magnetic disk drives 2 can be rotated synchronously with the sync signal.

As described above, when rotation synchronous control is executed for a plurality of disk drives such as a disk array drive. As shown in the prior art, the sync signal which is defined as a reference signal has to be generated by an external oscillator supplied to each of the disk drives.

The aforementioned prior art array disk system has the following disadvantages:

(1) To perform a spindle sync between the plurality of magnetic disk drives, each of the magnetic disk units is connected by a cable with the sync signal source (spindle sync/reference signal source). Thus, each of the magnetic disk units are provided with a connector.

However, the above-mentioned cables and connectors are apt to incur a fault such as broken conductor, poor connection, etc. If such a fault occurs, the spindle sync between the magnetic disk drives will be lost and the drives will not function properly.

(2) A cable and connectors are used to transmit the reference signal to the magnetic disk drive signal. Recently, however, many of the magnetic disk drives are designed compact and it is difficult to provide the units with such connecting means.

Also if a broken conductor is found in the cable or the connector is found to have a poor connector, it is extremely difficult to locate such a fault. The magnetic disk must be shut down until the fault is located.

(3) If an additional magnetic disk is connected to the aforementioned disk array drive, an additional cable must be connected between the added drive and the sync signal source.

In such a case, the disk array drive must be shut down with the power supply turned off once. Therefore, the disk array drive cannot be used. Also a very long time (for example, more than 10 sec) is required until all of the drives attain a spindle sync again.

SUMMARY OF THE INVENTION

Accordingly, an object of the present invention is to provide a rotation synchronous control system which enables a rotation synchronous function to be attained without utilizing a cable for supplying a sync signal such that reliability is improved by reducing faults caused by the cable.

A further object of the present invention is to provide a rotation synchronous control system which enables downsizing of the while system because the cable is not necessitated.

Still a further object of the present invention is to provide a rotation synchronous control system which enables an additional disk drive to be easily connected to the disk array drive.

To attain the above objects, the rotation synchronous control system according to the present invention comprises a host controller and a plurality of units each connected to the host controller wherein each of the plurality of units has a rotation device which forces at least one medium to rotate. A spindle sync/reference signal generating means which generates a sync signal forming the rotation reference of the rotation device. Additionally, a phase adjusting means adjusts the phase of the generated sync signal. Further, the host controller is operative to control each of the plurality of units so that the respectively corresponding sync signals of each of the plurality of units are synchronized to each other in rotation synchronous relationship between the plurality of units.

Preferably, the reference signal indicative of the rotation reference position of each unit is measured in the host controller to monitor the spindle sync state of each unit and an instruction for phase correction is given to each controlled unit based on the result of the measurement.

More particularly, when monitoring the sync state of each of the controlled units, the host controller designates one particular unit as a reference unit, and measures the difference in phase of the reference signal between the reference unit and other units to determine an amount of phase correction. The host controller then issues an instruction for a phase correction to each of the units by commanding each of the units to reduce the phase difference to zero.

Alternatively, when monitoring the sync state of each of the controlled units, the host controller per se as a reference reset signal and, measures the difference in phase between the reset signal and the sync signal of each unit to determine an amount of phase correction. The host controller than issues an instruction for phase correction to each of the controlled units by commanding each of the units to reduce the difference in phase to zero.

In a preferred embodiment, the spindle sync/reference signal generating means includes spindle sync/reference signal source and the phase adjusting means includes a phase adjuster.

BRIEF DESCRIPTION OF THE DRAWINGS

The above objects and features of the present invention will be more apparent from the following description of the preferred embodiments with reference to the accompanying drawings, wherein:

FIG. 5 shows an example arrangement of the spindle sync/reference signal source and phase adjuster of FIG. 3;

FIG. 6 is a time chart of the operations in the example arrangement shown in FIG. 5;

FIG. 7 is a time chart of the operations when the units A and B are in spindle sync with the respective sync signals as shown in FIG. 3;

FIG. 8 is a time chart of the operations when the phase of the sync signal is corrected under the control of the controller;

FIG. 9 is a time chart of the operations when all of the units (A and B) are in spindle sync;

FIG. 17 is a time chart for explaining the relationship between a periodic signal and a reset signal in FIG. 16;

DESCRIPTION OF THE PREFERRED EMBODIMENTS

The embodiments of the present invention will be described next with reference to the related figures.

Figure 1:
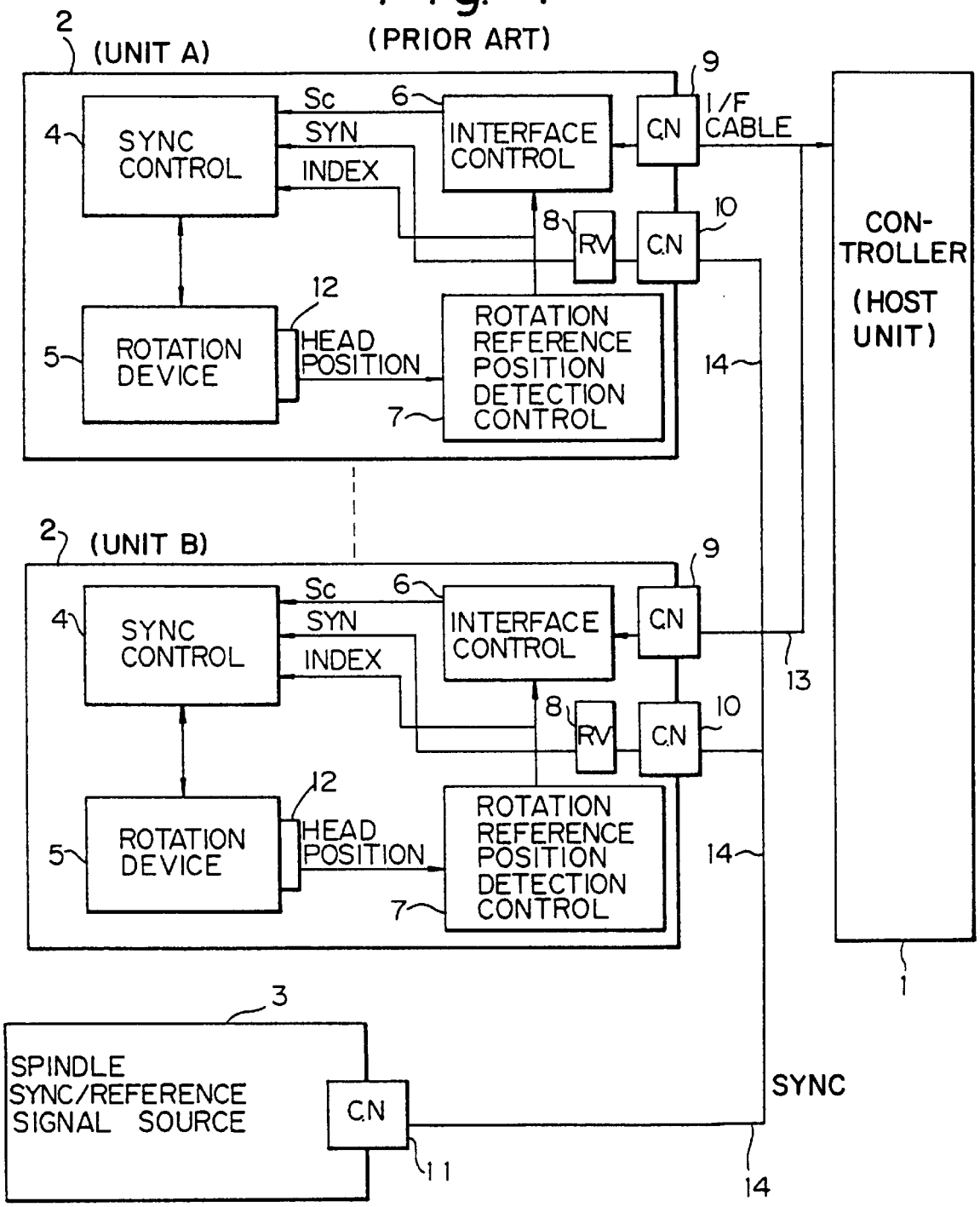
FIG. 1 is a block diagram of a conventional array disk system.
Figure 2:
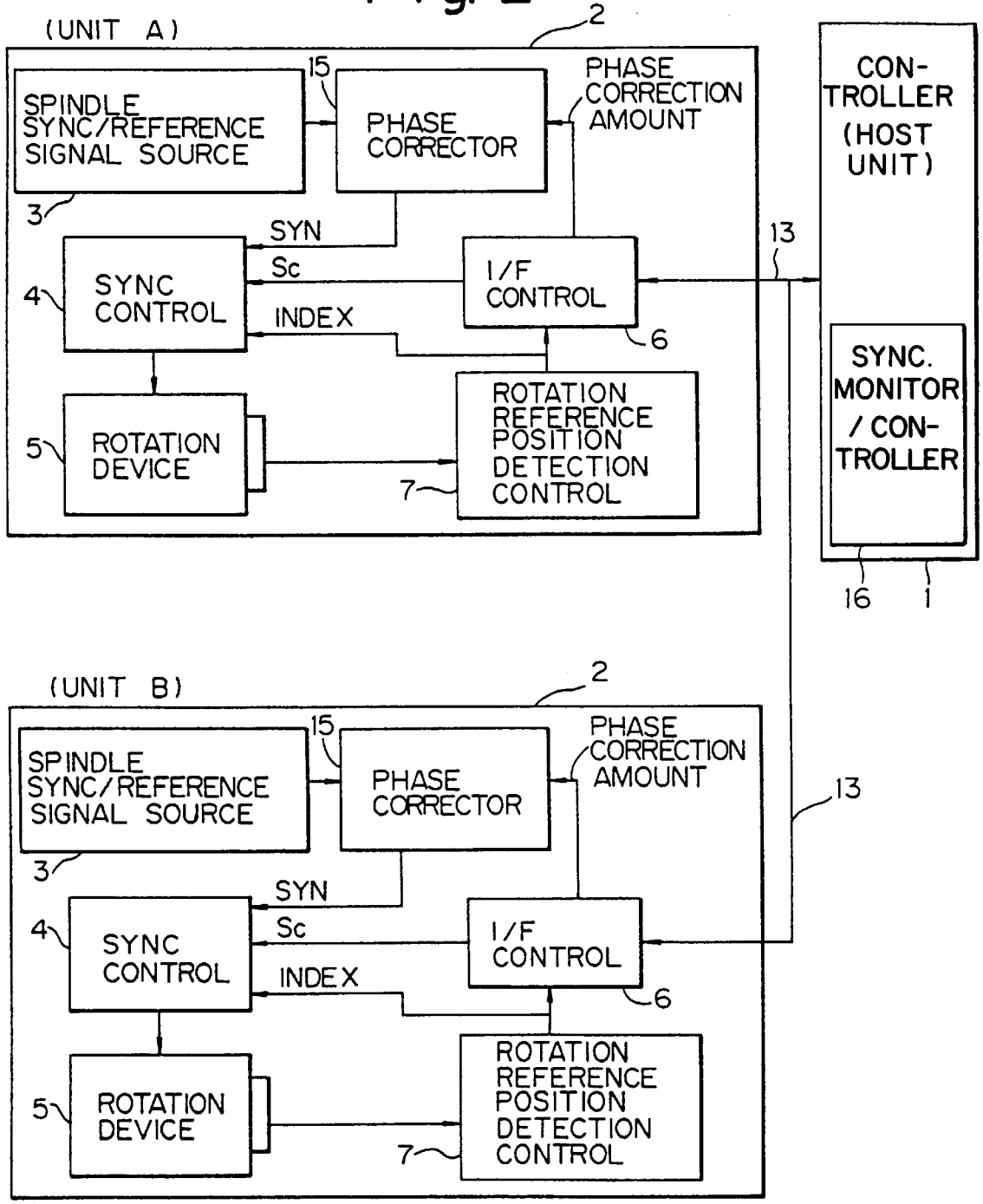
FIG. 2 shows an embodiment based on the principle of the present invention.

FIG. 2 shows an embodiment based on the principle of the present invention, in which the same elements as in FIG. 1. are indicated with the same reference numerals. The reference numeral 15 denotes a phase adjuster and 16 a sync monitoring control.

To solve the above mentioned problems associated with prior art systems, the present invention is configured as follows:

(1) The spindle sync control system (rotation synchronous control system) includes a host controller 1 and a plurality of units 2 connected to the host controller 1. Each of the plurality of units 2 includes a rotation device 5. The system has a spindle sync function for the rotation devices 5 to maintain a spindle sync between the rotation devices. Each of the units 2 is provided with a spindle sync/reference signal source 3 to generate a sync signal such that spindle sync is maintained. A phase adjuster 15 adjusts the phase of the generated sync signal, such that the phase-adjusted sync signal in each of the units 2 maintain the spindle sync between the units 2.

(2) In the spindle sync control system as in (1) above, the reference signal indicative of the rotation reference position of each unit 2 is measured in the host controller 1 monitors the spindle sync state of each unit 2. An instruction for phase correction is given to each unit 2 based on the result of the measurement.

(3) In the spindle sync control system as in (2) above, when each of the units 2 receives the instruction for phase correction from the host controller 1, an amount of phase correction included in the instruction is set in the phase adjuster 15 to adjust the phase of the sync signal.

(4) In the spindle sync control system as in (2) above, when monitoring-the sync state of each of the units 2, the host controller 1 designates a particular unit as a reference one, measures the difference in phase of reference signal between the reference unit and other units 2 to determine an amount of phase correction required and transmits an instruction for phase correction to each of the units 2.

The spindle sync control system according to the present invention functions as will be described below with reference to FIG. 2:

For a spindle sync between the rotation devices 5 of a plurality of units (e.g., magnetic disk drives) 2 connected to the controller 1, the spindle sync control system will provide a control as follow.

The spindle sync/reference signal source 3 of each unit 2 generates a sync signal which will be a reference necessary for the spindle sync control in accordance with the rotation speed of the rotation device 5. The sync control 4 makes the sync signal mentioned above a reference signal for spindle sync control such that it is synchronous with a reference signal generated from the rotation reference position detection control 7, thereby rotating the rotation device 5 (for example, its spindle motor).

When this control is done in each of the units 2, the rotation device 5 can be rotated synchronously with the sync signal being the reference for the unit.

During this operation, the sync monitoring control 16 of the controller 1 measures the reference signal from the rotation reference position detection control 7 of each unit 2 to monitor the sync state of the latter.

In this monitoring operation, any one of the units (e.g., unit A) is taken as a reference unit and a difference in phase of the reference signal in the unit B from that in the unit A is measured to determine a phase difference.

When the phase difference is thus determined, the controller 1 issues an instruction for phase correction to the unit under consideration.

In the unit 2 that has received the instruction, an amount of phase correction included in the instruction is set in the phase adjuster 15. Thus, the phase adjuster 15 will correct, as instructed, the phase of the reference sync signal generated from the spindle sync/reference signal source 3.

Thereafter, the sync control 4 provides a spindle sync control over the rotation device 5 such that the rotation device will rotate synchronously with the sync signal thus corrected in phase. The above-mentioned control operations are repeatedly done for the plurality of units 2 such that all units are in spindle sync.

Thus, the plurality of units can be kept in spindle sync without using any sync signal cable, connector for connection of the cable, as used in the prior art disk array drive. Therefore, the spindle sync control system according to the present invention will not incur any fault which would otherwise takes place as caused by the cable and connector in the prior art control system.

The embodiment of the spindle sync control system, i.e., rotation synchronous control system, according to the present invention will be described in further details here below with reference to the drawings.

Figure 3:
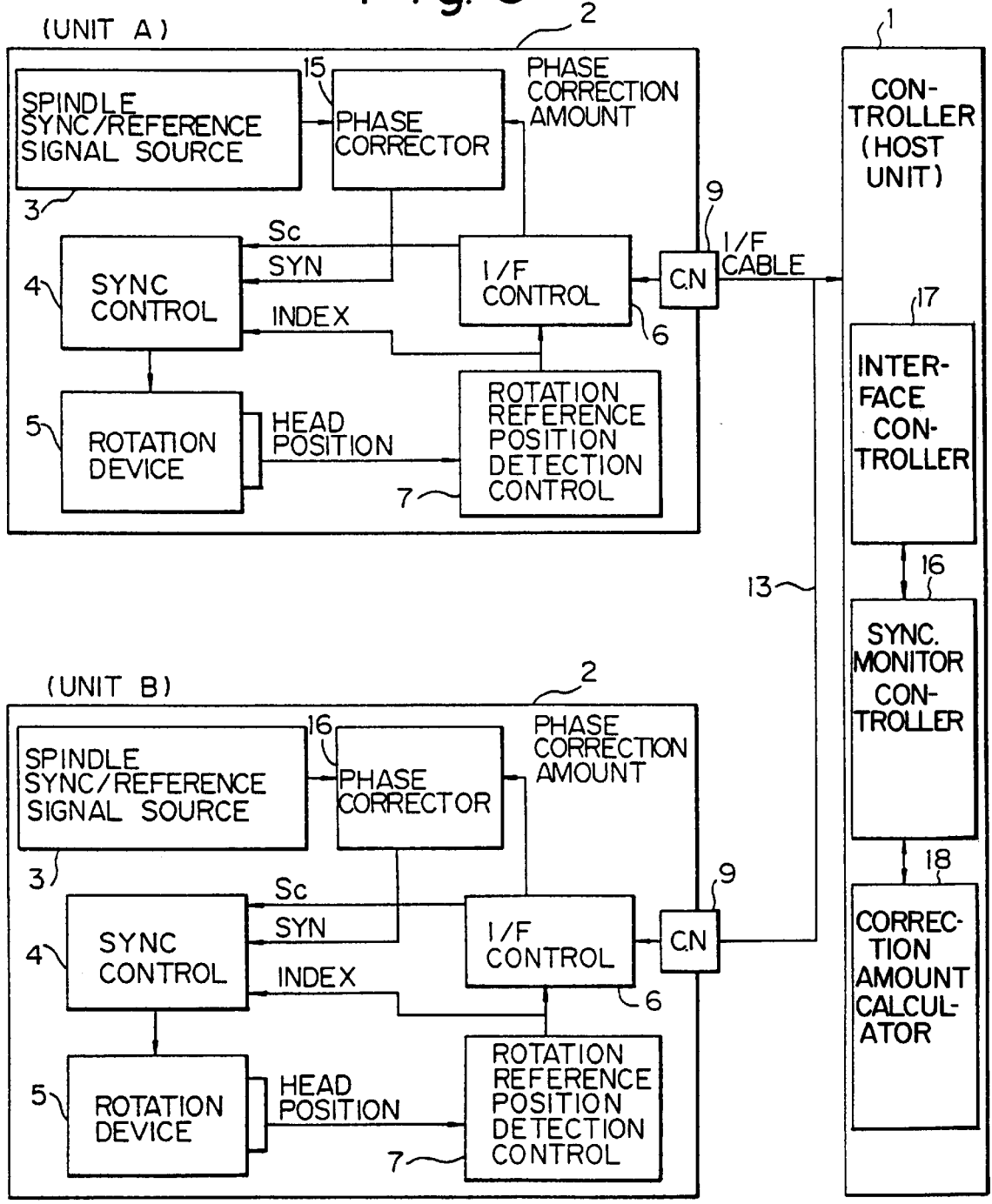
FIG. 3 is a block diagram of the disk array drive according to one embodiment of the present invention.
Figure 4:
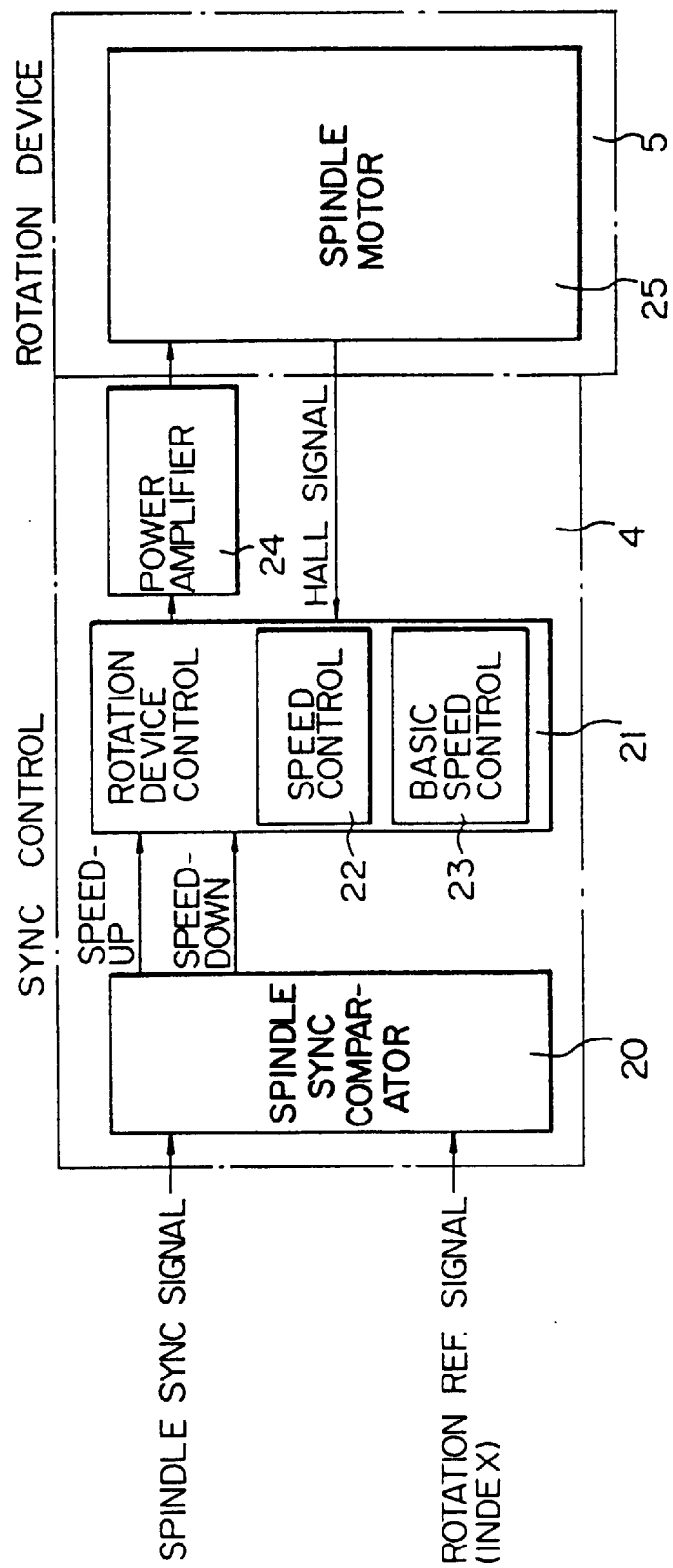
FIG. 4 shows an example arrangement of the rotation device and sync control of FIG. 3.

FIGS. 3 through 9 show an embodiment of the present invention. FIG. 3 is a block diagram of an array disk system, FIG. 4 is an example arrangement of the rotation device and sync control, FIG. 5 is an example arrangement of the spindle sync/reference signal source and phase adjuster, FIG. 6 is a time chart of the operations in the example arrangement shown in FIG. 5. FIG. 7 shows a time chart of the operations when the units A and B are in spindle sync with the sync signals supplied to themselves, FIG. 8 is a time chart of the operations when the controller has corrected the phase of sync signal, and FIG. 9 is a time chart of the operations when all the units (A, B) are in spindle sync.

In the Figures, the same elements as shown in FIG. 2 are indicated with the same reference numerals as in. The reference numeral 17 denotes an interface (I/F) control, 18 a correction-amount calculator, 20 a spindle sync comparator, 21 a rotation device control, 22 a speed control, 23 a basic speed control, 24 a power amplifier, 25 a spindle motor, 26 an oscillator, 27 an initial-setting register, 28 and 30 programmable counters, respectively, and 29 a phase correction-amount register.

This embodiment is applied to an array disk system (similar to the prior-art system) to have a spindle sync control over the spindle motor. In this array disk system, a plurality of magnetic disk drives 2 is connected to a controller (host unit).

In FIG. 3, only two magnetic disk drives are shown, but more than two units 2 maybe connected to the controller 1 in practice. For each of the magnetic disk drives 2, there is provided a spindle sync/reference signal source 3, sync control 4, rotation control 5, interface control 6, rotation reference position detection control 7, connector 9, magnetic head 12, and phase adjuster 15, etc.

Figure 20:
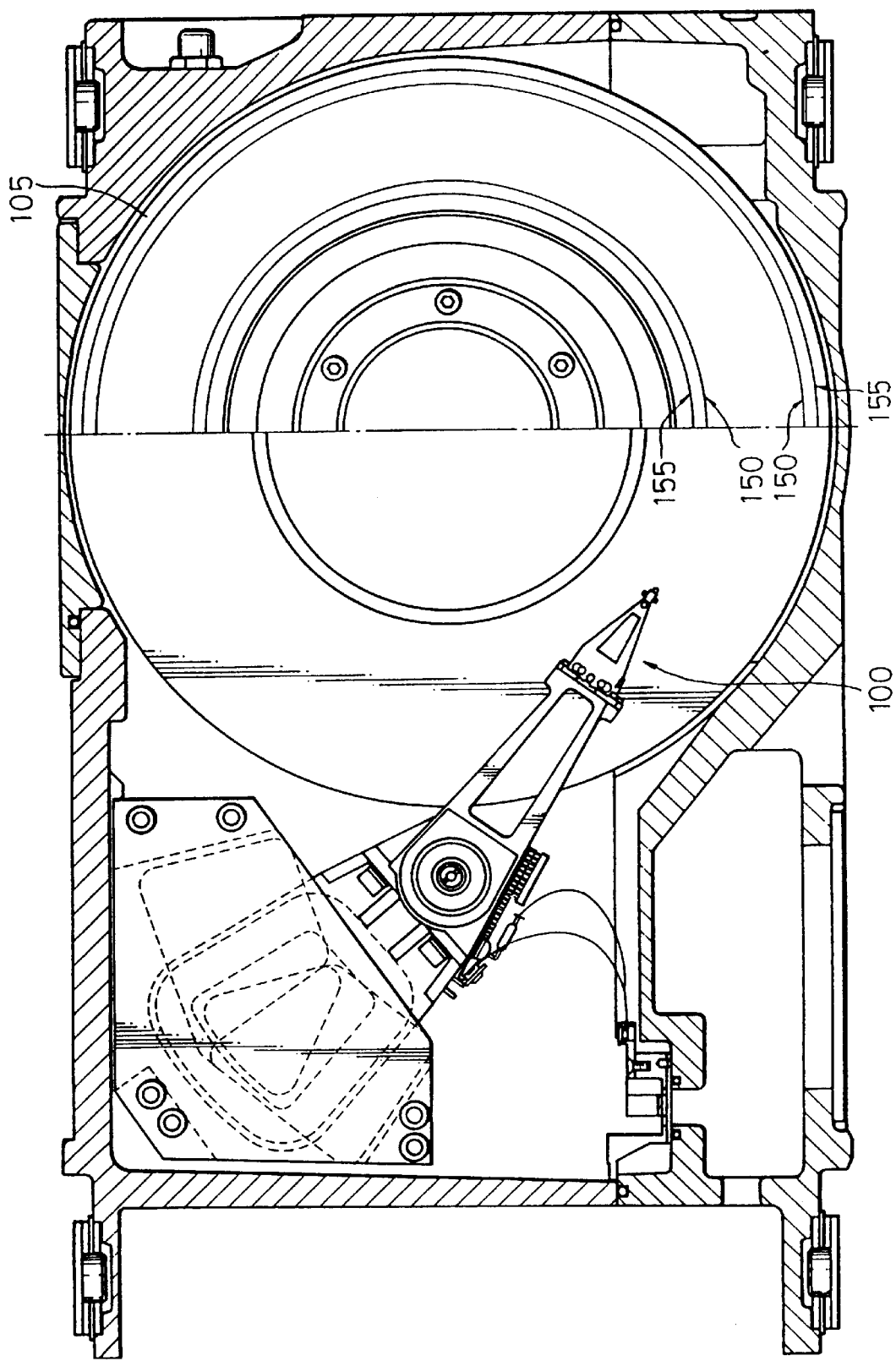
FIG. 20 is a partially sectional plan view showing a mechanism of a magnetic disk drive.
Figure 21:
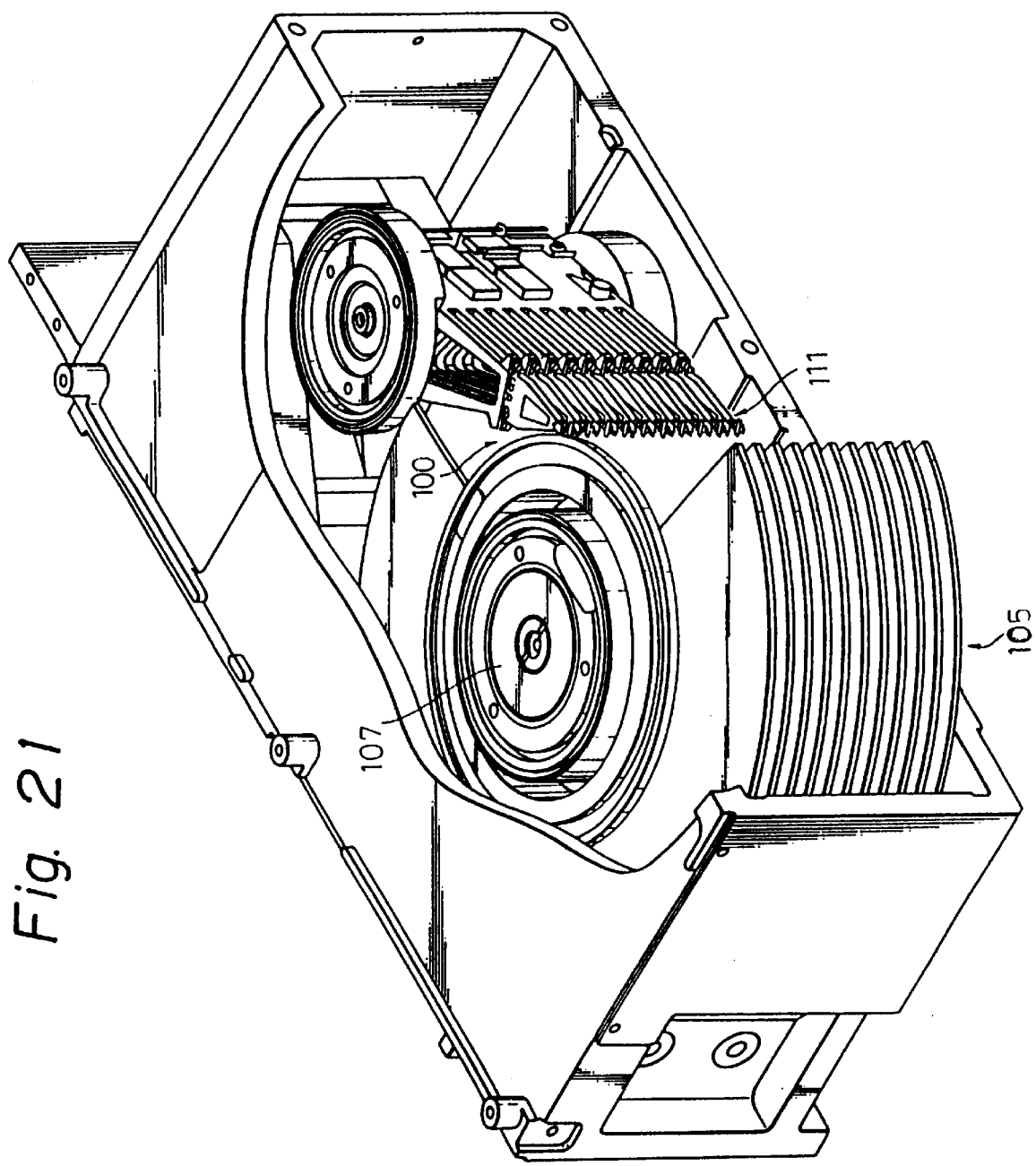
FIG. 21 is a perspective view, partially cut off, showing a mechanism of a magnetic disk drive.
Figure 22:
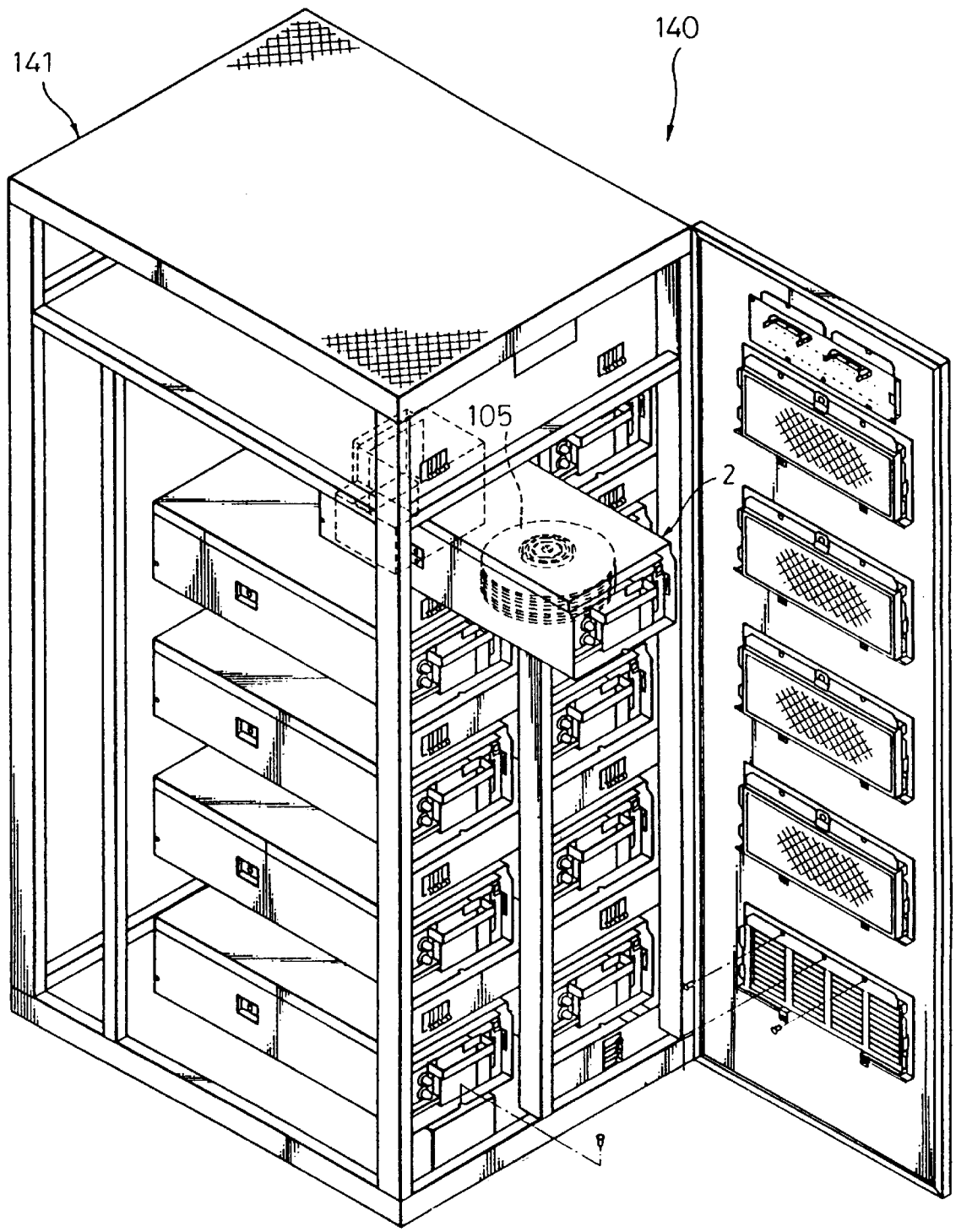
FIG. 22 is a perspective view showing an overall disk array drive.

Here, in order to facilitate understanding of the embodiment according to the present invention, a partial sectional plan view showing a mechanism of a magnetic disk drive and a perspective view, partially cut away, showing a mechanism of a magnetic disk drive are respectively illustrated in FIGS. 20 and 21. As seen from these figures, a plurality of disks (e.g., eleven disks in FIG. 21) 105 are rotated simultaneously. The tracks on a recording surface of each disk 105 are written with a predetermined data pattern. However, the tracks at both ends of the inner zone and the outer zone of the disk 105 are formed as guard bands 150 in which a particular pattern is written, instead of a data pattern, which particular pattern is used for stopping a seek operation of two kinds of heads 100 and 111 which will be explained hereinafter. Further, at the inner and the outer sides of the guard band 150, an erase zone 155 (FIG. 20) is formed for mechanically stopping the heads 100 and 111. Preferably, the present invention is adapted to a disk array drive 140 as shown in FIG. 22, wherein reference numeral 104 denotes a magnetic disk drive, 105 disk and 141 a housing that can accommodate a plurality of magnetic disk drives.

Also for the controller 1, there is provided an interface (I/F) control 17, sync monitoring control 16, correction-amount calculator 18, etc. The controller 1 and each of the magnetic disk drives 2 (units A and B) are connected to each other by means of an interface (I/F) cable 13.

In this case, the interface cable 13 is connected at one end thereof to the connector (not shown) of the controller 1 while the other end of the interface cable is connected to the connector 9 of each magnetic disk drive 2.

In the disk array system of such an arrangement, the rotation device 5, magnetic head 12, rotation reference position detection control 7, interface control 6, and connector 9 in each of the magnetic disk drives 2 are the same as described in the aforementioned prior art system and the other components are the newly provided components of this invention.

In the aforementioned prior art system, the spindle sync/reference signal source 3 is provided separately to each magnetic disk drive 2. In this invention, however, it is provided within each magnetic disk drive 2. The spindle sync/reference signal source 3 consists of an oscillator for generating a reference sync signal used in spindle sync control of the spindle motor.

The phase adjuster 15 uses the amount of phase correction received as an instruction from the controller 1 to correct the phase of the reference sync signal supplied by the spindle sync/reference signal source 3 to produce a sync signal. The interface control 6 provides various kinds of interface control, etc.

The interface control 17 provided in the controller 1 provides various kinds of interface control. The sync monitoring control 16 monitors the spindle sync of each magnetic disk drive 2 and forms instruction for phase correction. The correction amount calculator 18 calculates an amount of phase correction based on the instruction from the sync monitoring control 16.

The aforementioned sync control 4 and rotation device 5 are arranged as shown in, for example, FIG. 4. In the example in FIG. 4, the sync control 4 is provided with a spindle sync comparator 20, a rotation device control 21 and a power amplifier 24. The rotation device 5 is provided with a spindle motor 25. Also the rotation device control 21 is provided with a speed control 22 and basic speed control 23.

The spindle sync comparator 20 is supplied with a spindle sync signal from the phase adjuster 15 (see FIG. 3) and a rotation reference signal (for example, index signal) from the rotation reference position detection control 7 (see FIG. 3). The comparator 20 compares these two signals and supplies the rotation device control 21 with a "speed-up" or "speed-down" signal in accordance with the phase difference between the signals.

The spindle motor 25 functions as follows. First, the basic speed control 23 and speed control 22 of the rotation device control 21 drives the power amplifier 24 so that the spindle motor 25 will rotate at the basic speed.

In this example, the spindle motor 25 is provided with a Hall device which supplies the rotation device control 21 with a Hall signal (pulse) corresponding to the speed of the spindle motor 25. The rotation device control 21 uses this Hall signal to drive the power amplifier 24 (control the drive current of the power amplifier) so that the spindle motor 25 will rotate at the basic speed.

Thereafter, when the spindle motor 25 reaches the basic speed, the rotation device control 21 waits for an instruction for "speed-up" or "speed-down" from the spindle sync comparator 20. Receiving a "speed-up" or "speed-down" instruction from the spindle sync comparator 20, the rotation device control 21 changes the drive current of the power amplifier 24 to keep rotating the spindle motor 25.

When the rotation reference signal (index signal) to the spindle sync comparator 20 changes, the spindle sync comparator 20 issues a corresponding "speed-up" or "speed-down" instruction. The rotation device control 21 controls the drive current of the power amplifier 24, thereby permitting the spindle motor 25 to rotate synchronously with the spindle sync signal.

The aforementioned spindle sync/reference signal source 3 and phase adjuster 15 are arranged as shown in, for example, FIG. 5. In the example in FIG. 5, the spindle sync/reference signal source 3 is provided with an oscillator 26, initial-setting register 27 and a programmable counter 28. The phase adjuster 15 is provided with a phase correction-amount register 29 and a programmable counter 30.

The initial-setting register 27 is used to initially set a "period" data to be loaded into the programmable counter 28. This setting is performed by an external processor or the like when, for example, the power supply to the system is turned on. The phase correction-amount register 29 is a register used to set a "phase correction amount" data to be entered into the programmable counter 30. This setting is done by, for example, the interface control 6 (see FIG. 3) based on an instruction issued from the controller 1.

The oscillator 26 produces clock pulses (indicated with by CLK1 in FIG. 6) which are supplied to the programmable counters 28 and 30. The programmable counter 28 counts the clock pulses and divides the count by the "period" data set in the initial-setting register 27 to divide the frequency of the clock pulses and produce a sync signal "Carry1" (see FIG. 6).

More particularly, the clock pulses CLK1 generated by the oscillator 26 are frequency-divided by the programmable counter 28 into a value set by the initial-setting register 27 to produce a sync signal "Carry1" suitable for the speed of the spindle motor 25.

When the sync signal "Carry1" is thus generated, the value set by the initial-setting register 27 entered again (when "Carry1" is supplied at "LOAD", the value set by the initial-setting register 27 is entered into the programmable counter 28) to produce a signal of which the period is always constant.

With the sync signal "Carry1", the phase adjuster 15 enters the value set by the phase correction-amount register 29 into the programmable counter 30 (when "Carry1" is supplied to "LOAD" of the programmable counter 30, the "phase correction amount" data set by the phase correction-amount register 29 is accepted).

The programmable counter 30 shifts the phase every time it counts a set number of pulses CLK1 and produces a requested sync signal "Carry2" (see FIG. 6). In this case, since the phase correction amount set by the phase correction-amount register 29 is renewed when an instruction is received from the controller 1, the programmable counter 30 corrects the phase always using the renewed data.

The array disk system having the above-mentioned arrangement will function as will be described herebelow with reference to FIGS. 7 through 9.

First, the spindle sync/reference signal sources 3 of the units A and B (magnetic disk unit) shown in FIG. 3 generate sync signals for use as a reference required for spindle sync control of each unit in accordance with the speed of the spindle motor of the rotation device 5 of each unit.

The sync controls 4 of the units A and B synchronize the reference signal (index signal) received from the rotation reference position detection controls 7 with the sync signal (spindle sync signal) based on the rotation position signal read by the magnetic head 12 to rotate the spindle motors 25 of the rotation devices 5 (see FIGS. 3 and 6.)

In this condition, the units A and B are in spindle sync with their own sync signals. The functional timing is shown in FIG. 7. In this case, it is assumed that there is a difference t in rotation position between the units A and B.

The sync monitoring control 16 of the controller 1 issues an instruction predetermined intervals to the units A and B at, for example, predetermined intervals to receive a reference signal (index signal) from each of the units A and B.

In this case, the sync monitoring control 16 issues an instruction to the interface control 6 of each of the units A and B through the interface control 17.

Thereafter, in response to that instruction, a reference signal (index signal) produced by the rotation reference position detection control 7 of each of the units A and B is sent to the controller 1 through the interface 6. The controller 1 receives the reference signal through the interface control 17 and sends it to the sync monitoring control 16.

In this case, the controller 1 selects one of the plurality of controlled units A and B connected to the controller 1 (actually, more than two units may be connected) as a reference unit (for example, unit A). The sync monitoring control 16 measures through the interface control 17 the difference in phase of the reference signal between the unit A selected as the reference unit with that (index signal) of the unit B.

Thereafter, the correction-amount calculator 18 operates, as instructed by the sync monitoring control 16, to calculate a difference t in rotation position between the units A and B (see FIG. 7) based on the result of the phase difference measurement in the sync monitoring control 16.

The controller 1 will send to any other controlled unit other than the designated reference unit A, a phase correction amount derived from, the rotation position difference t. More particularly, the controller 1 instructs, by a command given through the interface control 17, each of the controlled units (other than the unit A) to correct the phase (a phase correction amount to each unit).

The unit B other than the unit A receives the phase correction command from the controller 1 through the interface control 6 and analyzes the contents of the command. It extracts the phase correction-amount data from the command and sets it into the phase correction-amount register 29 of the phase adjuster 15 (see FIG. 5).

As the result, the phase adjuster 15 uses the newly set phase correction amount to correct the phase by an amount instructed by the controller 1 and then supplies a sync signal to the sync controller 4. By this phase correction, the sync signal is corrected as shown in FIG. 8.

As shown in FIG. 8, the reference signal (index signal) and sync signal are made coincident in phase in the units A and B with the above-mentioned phase correction performed with respect to the unit B. The sync signal of the unit B will thus be coincident in phase with the reference and sync signals of the unit A.

The unit B then sends the sync signal synchronous with that of the unit A to the sync control 4 to make a spindle sync control over the spindle motor 25 (see FIG. 4) of the rotation device 5. In this spindle sync control, the spindle sync comparator 20 compares the above-mentioned sync signal (spindle sync system) with the reference signal (rotation reference signal) to give a speed-up or speed-down instruction to the spindle motor 25 for the purpose of performing a spindle sync control.

Thus, the sync and reference signals are made coincident in phase with each other in the unit B as shown in FIG. 8. Namely, the spindle motor 25 is rotated synchronously with the sync signal. This control is sequentially performed with all the units other than the unit A so that all the units can be put in spindle sync with the reference unit A.

Some preferred embodiments of the present invention have been described in the foregoing, but the present invention may be embodied as will be described below:

(1) The spindle sync control system of the present invention is not only applicable to any array disk system but may be applied to other similar systems.

(2) The rotation device can be applied to a system in which a spindle motor is used as well as to other similar systems.

FIG. 10 is a flow chart for explaining the sequence of performing a phase correction by utilizing the index signal of each unit in FIG. 5.

Figure 10A:
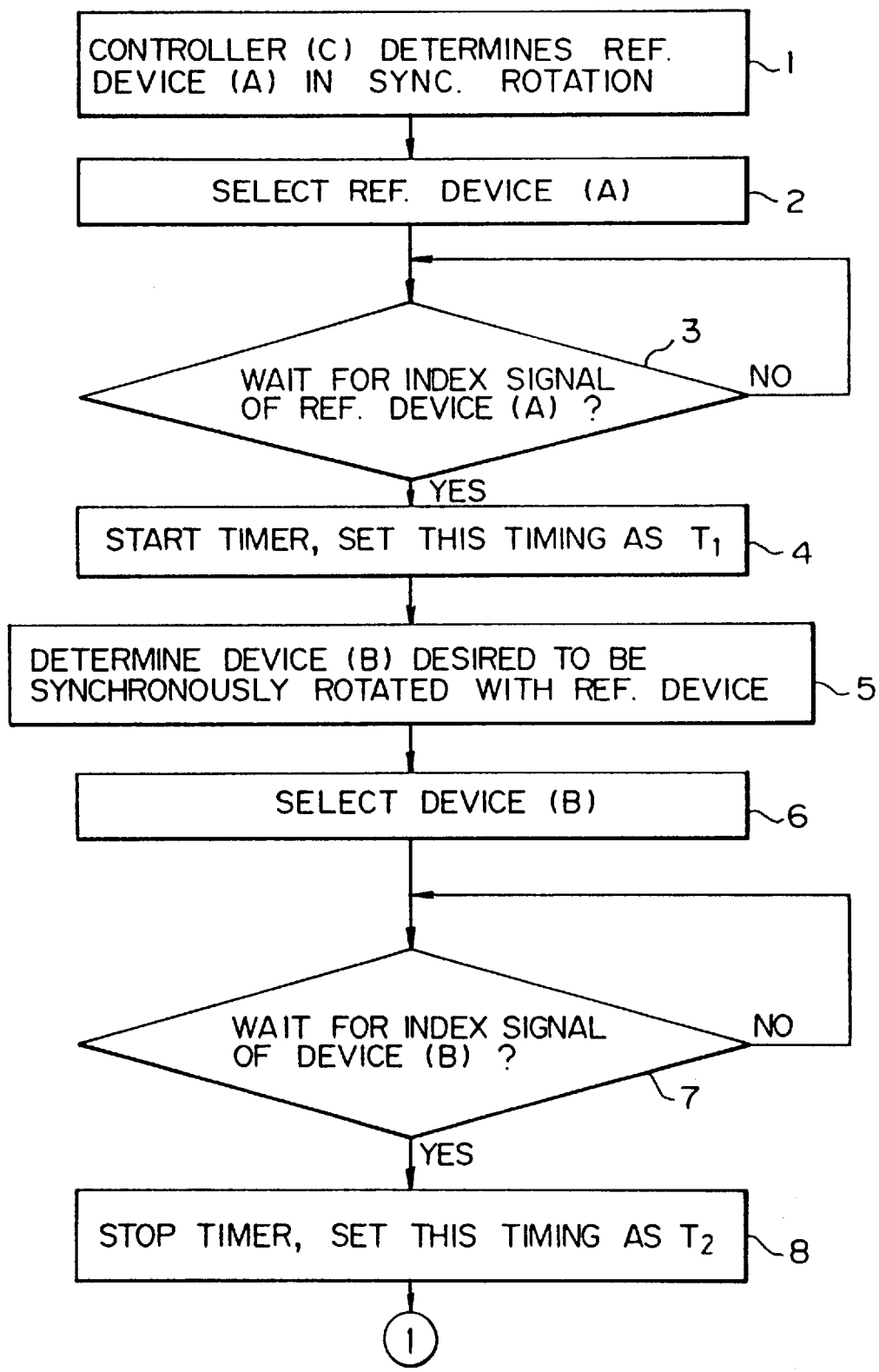
FIG. 10 is a flow chart showing the sequence of performing a phase correction by utilizing the index signal of each unit in FIG. 5.
Figure 10B:
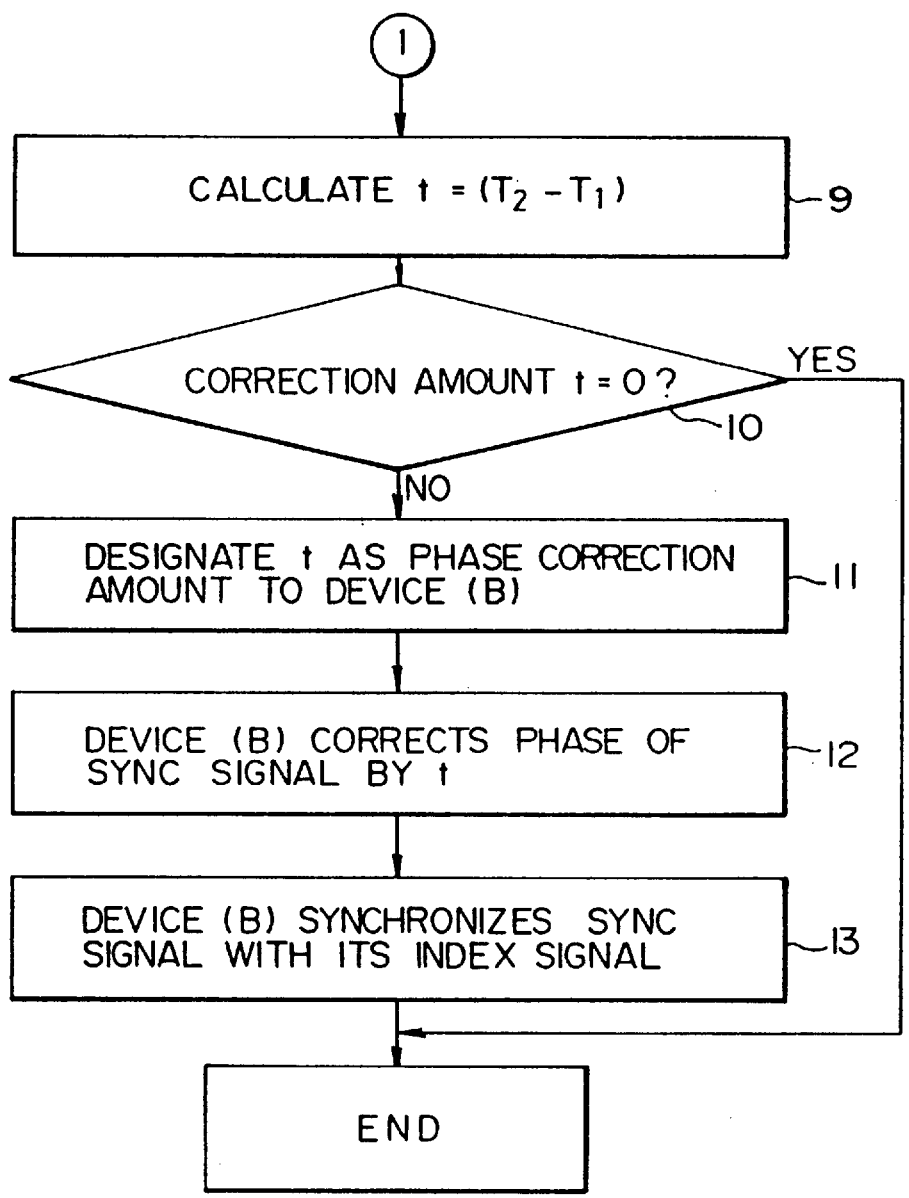

However, in this case, a sequential flow chart is separated into the first half and second half illustrated in FIG. 10(A) and FIG. 10(B), respectively.

In FIG. 10(A) and FIG. 10(B), the sequence for attaining the rotation synchronous condition between the respective units by utilizing the reference signals (e.g., index signal) will be described. In this case, the above reference signals of the respective units are defined as the interface signal.

As illustrated in FIG. 10(A) and FIG. 10(B), first, a controller 1 selects one unit, e.g., unit A as the reference unit of rotation synchronous operations (step 1, 2). Next, the controller 1 starts a timer when the reference signal generated at a constant period is sent from the above reference unit A (step 3). Here, the time when a timer is started is defined as $T_1$ (step 4). Further, the controller 1 selects the unit to be synchronously rotated with the reference unit A, e.g. unit B (step 5, 6). Further, the controller 1 starts up the timer when the reference signal generated at a constant period is sent from the above unit B, in a similar manner as in step 3 (step 7). In this case, the time when the timer is started is defined as $T_2$ (step 8). Further, the-difference between $T_2$ and $T_1$, $(T_1-T_2)$ is calculated and the result of the calculation is defined as an amount of rotation position error (step 9). The controller 1 takes this value t as the phase correction amount and instructs the unit B to execute the phase correction (step 10, 11). In accordance with the instruction of phase correction, the unit B corrects the phase of the reference signal by the value of t (step 12, 13). In such a manner, the rotation synchronous operations between the unit A and unit B can be performed.

FIG. 11 is a flow chart for explaining the sequence of performing a phase correction by utilizing the sector signal of each unit as shown in FIG. 5.

Figure 11A:
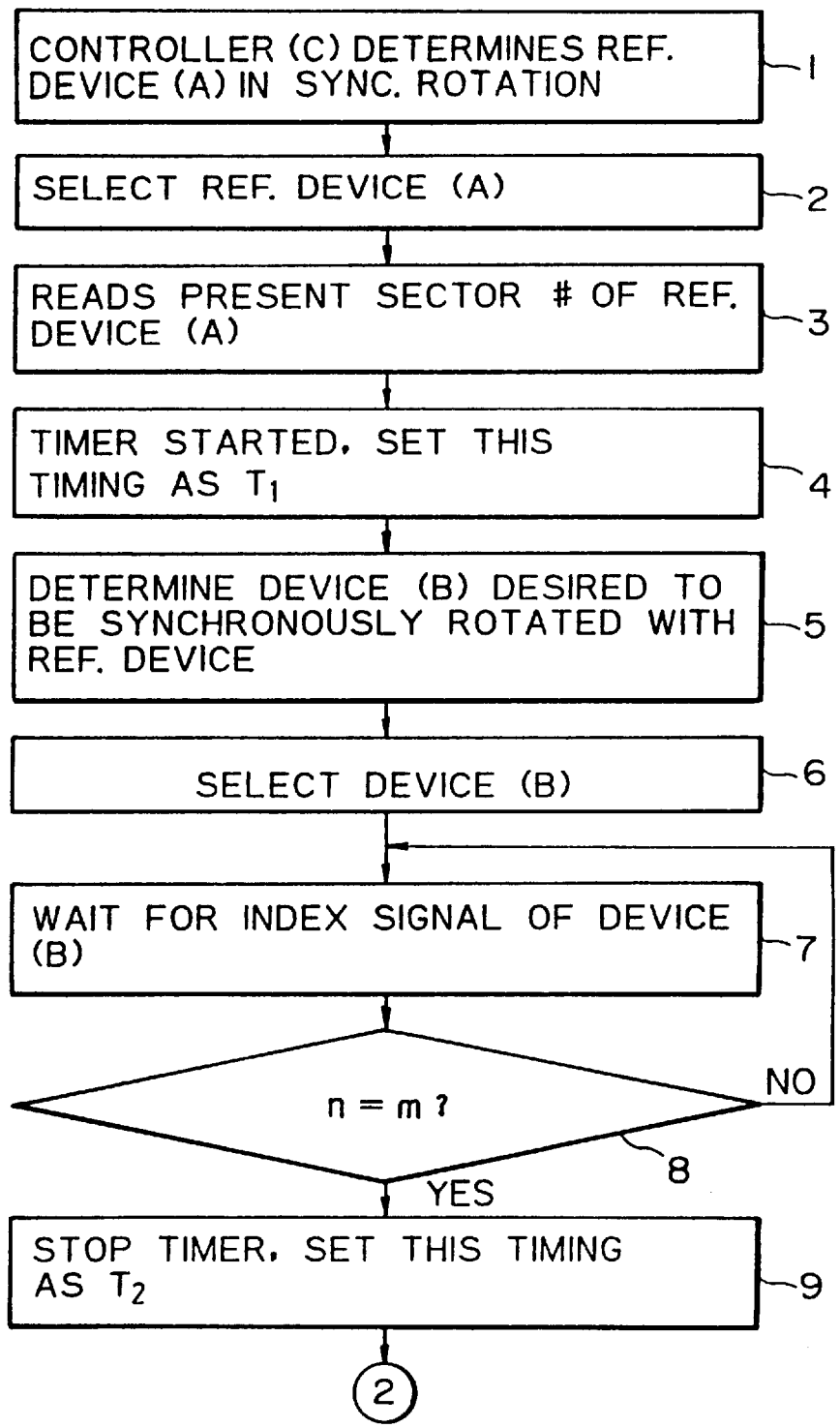
FIG. 11 is a flow chart for explaining the sequence of performing a phase correction by utilizing the sector signal of each unit in FIG. 5.
Figure 11B:
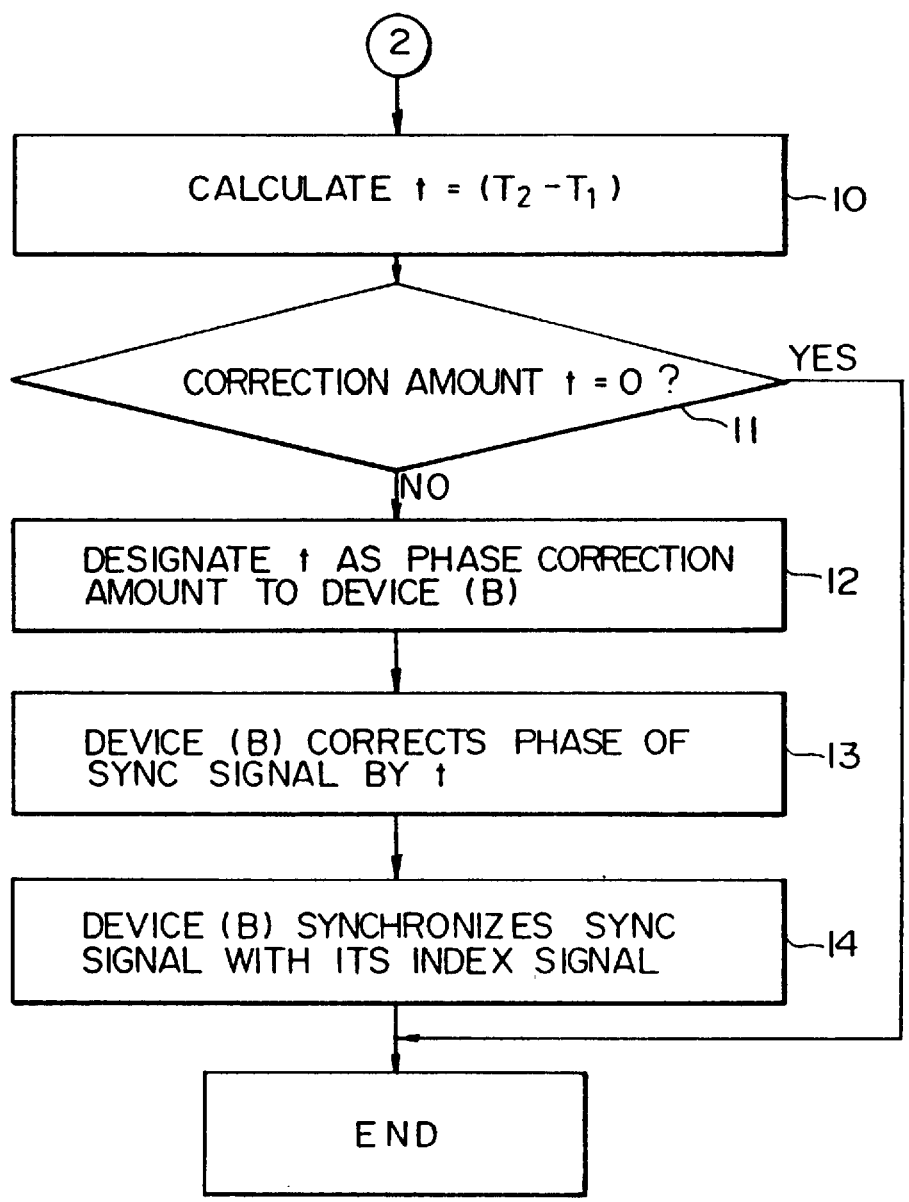

Also, in this case, a sequential flow chart is separated into the first half and second half as illustrated in FIG. 11(A) and FIG. 11(B), respectively.

In FIG. 11(A) and FIG. 11(B), the sequence for attaining the rotation synchronous condition between the respective units by utilizing the sector signals (sector values) will be described. In this case, the above sector signals indicating a given position of the head on the recording surface of the medium (disk) of each unit are defined as the interface signal.

The sequence of performing a phase correction as shown in FIG. 11 is similar to that shown in FIG. 10. However, as illustrated in the flow chart, step 3 and steps 7, 8 of FIG. 11 are different from those of FIG. 10. To be more specific, in step 3 of FIG. 11, the current sector number (sector value) n is read out, instead of the reference signal issued by the reference unit A. In other words, the current position of the head is detected based on this sector number n. The time when the sector number n is read out is defined as $T_1$. Further, in steps 7, 8 the current sector m is also read out. The time when the former sector number m becomes equal to the latter is defined as $T_2$. If $(T_2-T_1)$ is calculated, the rotation synchronous operations between the unit A and unit B can also be performed.

Figure 12:
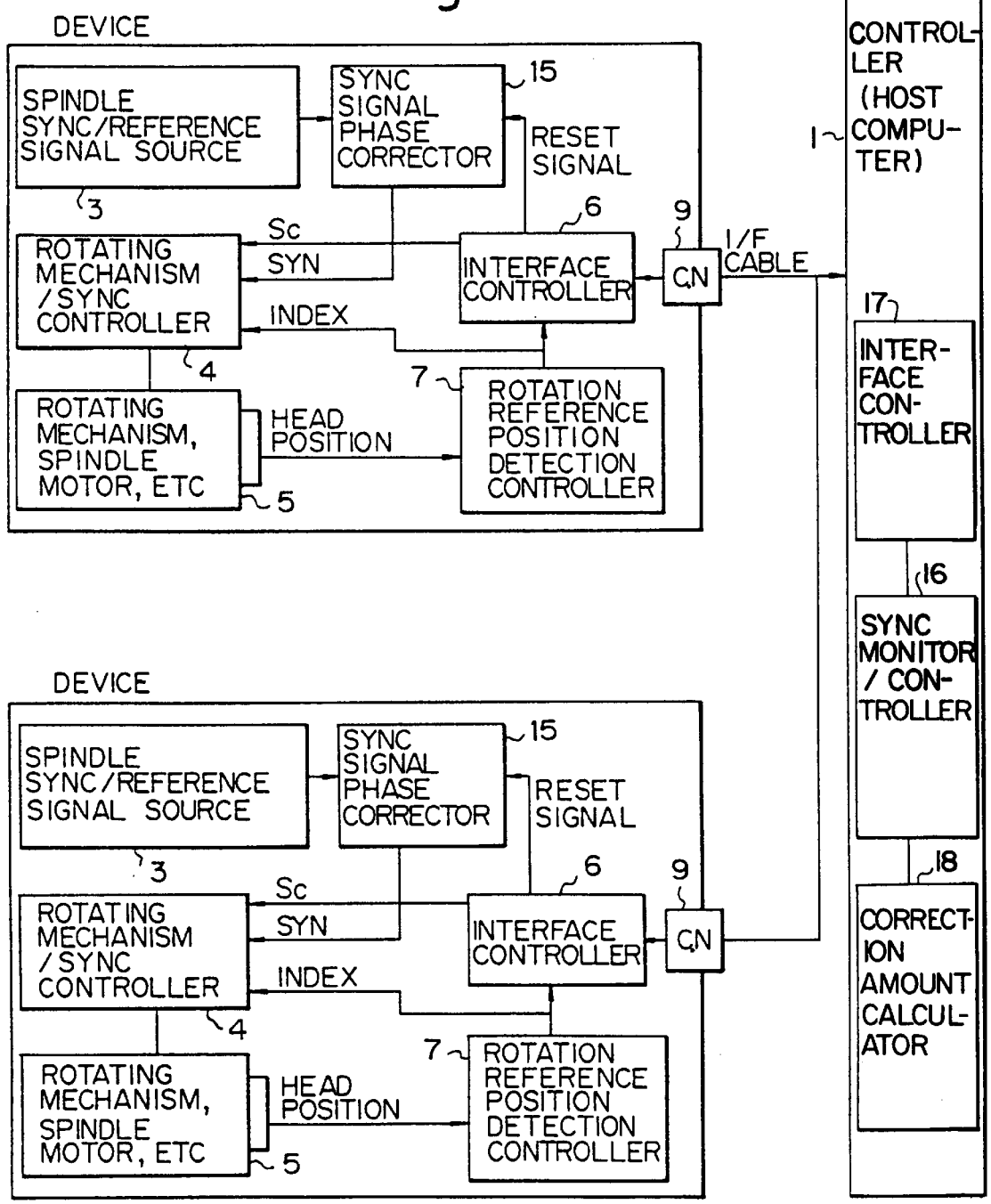
FIG. 12 is a block diagram of the disk array drive according to another embodiment of the present invention.

FIG. 12 is a block diagram of the disk array drive according to another embodiment of the present invention. Each component in the disk drive of FIG. 12 is essentially the same as those of FIG. 3. However, in this case, a reset signal is sent from the respective interface control 6 of unit A and B to the respective phase adjuster 15. In other words, in this embodiment, the reference unit is not selected and the reference signal of the reference unit is not set. Instead of the reference signal of the reference unit, the above reset signal is defined as the reference signal. Thus, the phase correction is performed for each of the units A and B by utilizing the reset signal.

Figure 13:
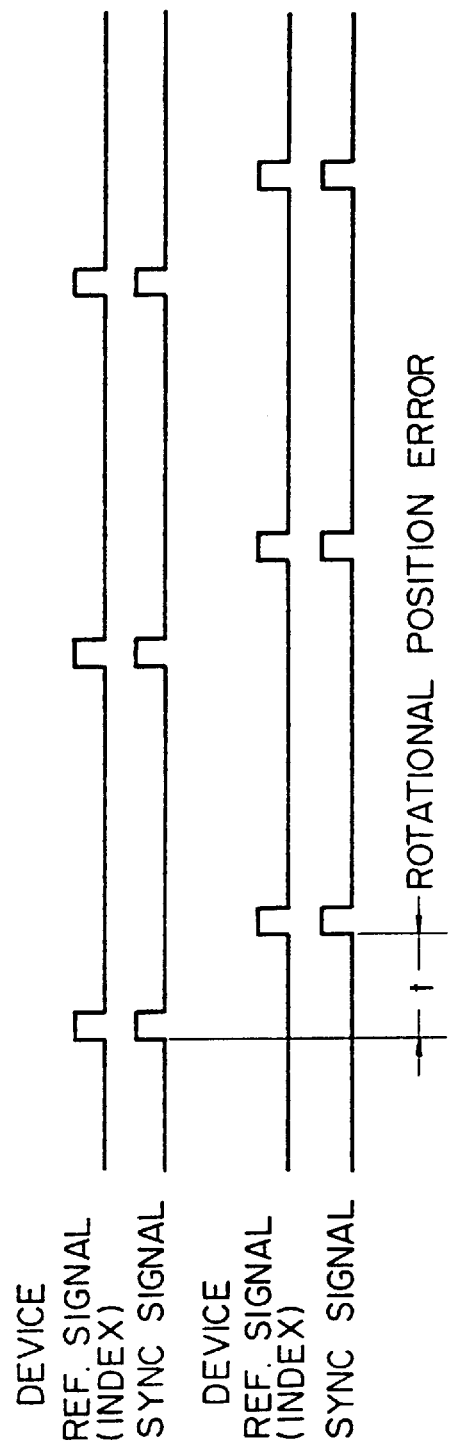
FIG. 13 is a time chart of the operations when the units A and B are in spindle sync with their respective sync signals of FIG. 12.

FIG. 13 is a time chart of the operations when the units A and B are in spindle sync with their respective sync signals of FIG. 12.

Figure 14:
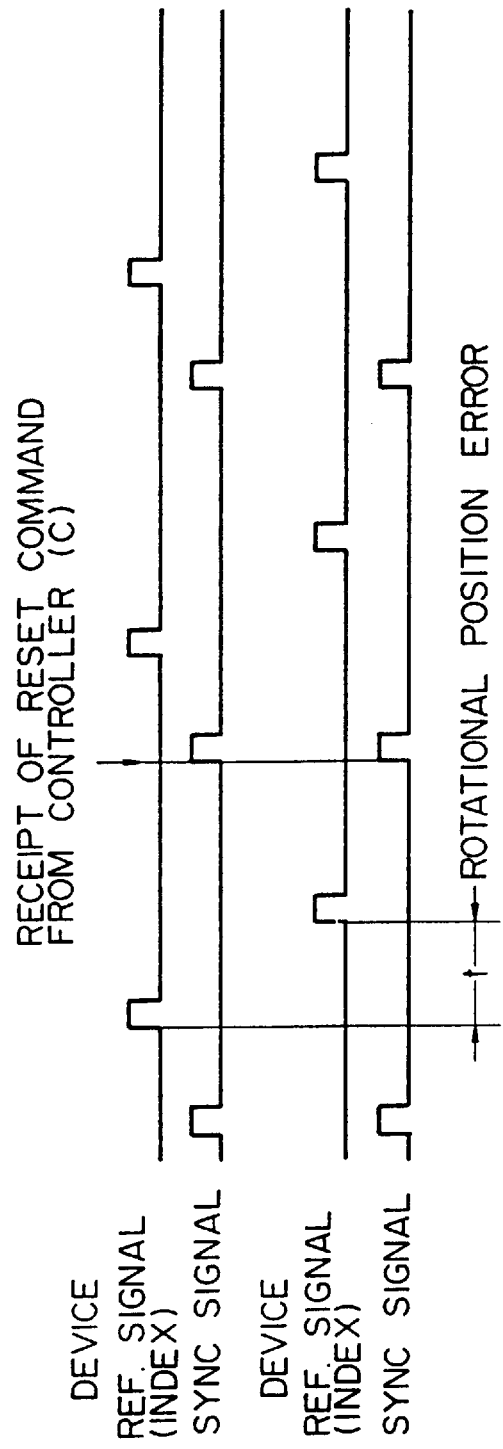
FIG. 14 is a time chart of the operations when a reset command of the respective sync signals is sent from a controller to the units A and B of FIG. 12.

Further, FIG. 14 shows a time chart of the operations when a reset command of the respective sync signals is sent from a controller to the units A and B of FIG. 12.

Figure 15:
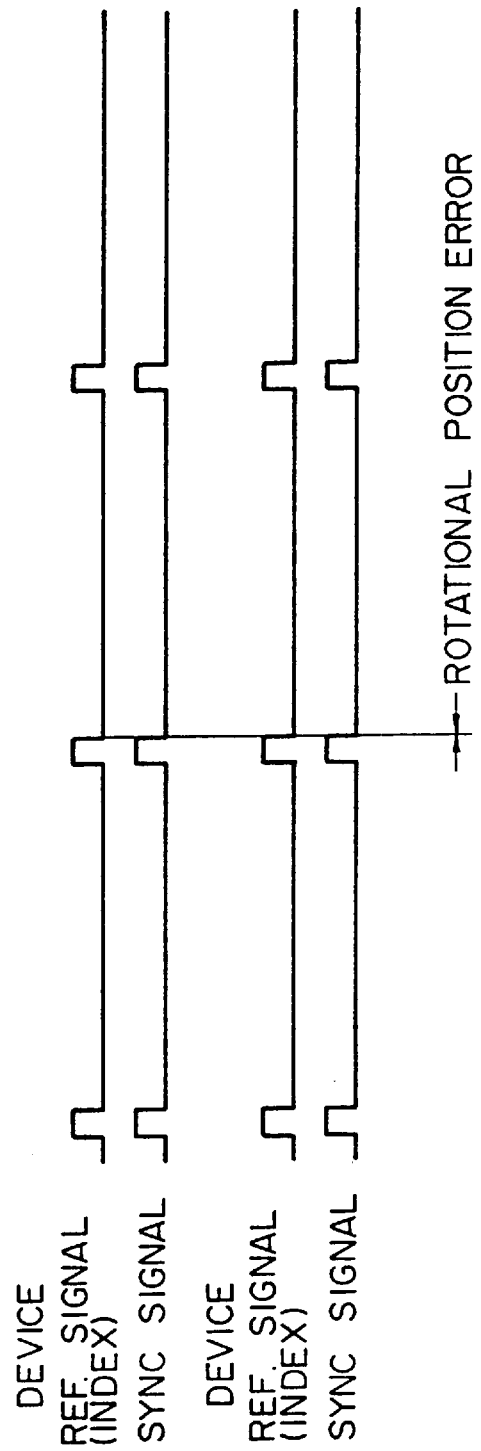
FIG. 15 if a time chart of the operations when all the units (A, B) are in spindle sync through use of the reset command of a controller of FIG. 12.

Further, FIG. 15 is a time chart of the operations when all the units (A, B) are in spindle sync when a reset command of a controller of FIG. 12 is utilized.

In FIG. 13, each of the units A, B are synchronously rotated using only the synchronous signal and the reference signal of each of the units A, B per se. Therefore, each of the units A, B is rotated with the rotation position error of t.

In such condition, as illustrated in FIG. 14, when a reset command is sent from the controller 1 to each of the units A, B, the synchronous signal of the unit per se and the reference signal becomes unsynchronized.

In FIG. 15, the timing of all the units A, B and the timing of the reference signal finally conform to each other, and therefore the rotation synchronous condition is attained between the respective units.

Figure 16:
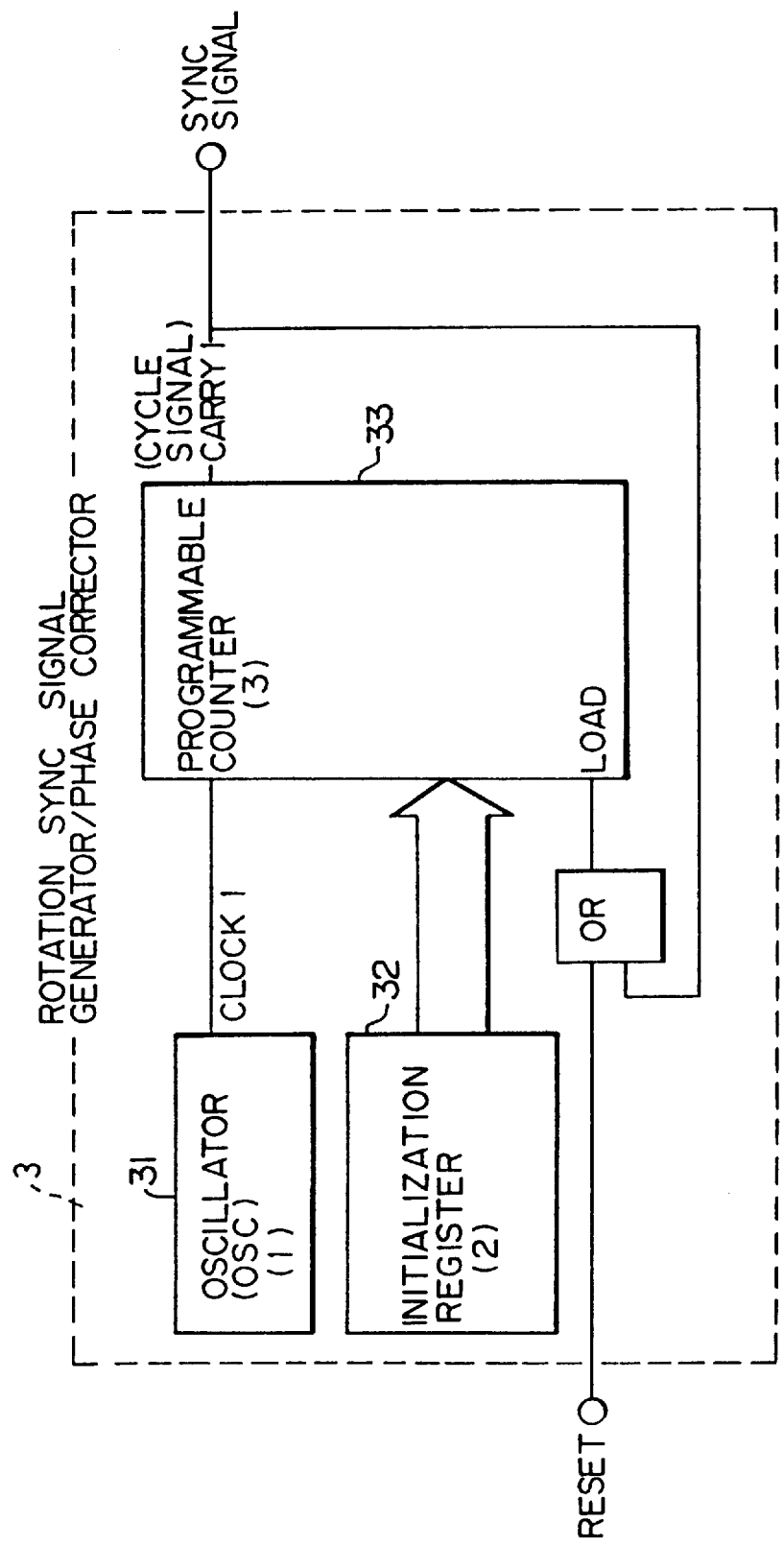
FIG. 16 shows an example arrangement of the spindle sync/reference signal source and phase adjuster of FIG. 12.

FIG. 16 shows an example arrangement of the spindle sync/reference signal source and phase adjuster of FIG. 12.

In FIG. 16, a spindle sync/reference signal source includes an oscillator 31 which generates a frequency signal (Clock 1) and a programmable counter 33 which divides the frequency signal (Clock 1). The initialization register 32 is set at a certain value. By using the set values, frequency division of the programmable counter (33) is performed and the periodic signal (Carry1) is generated. This Carry 1 signal is defined as the synchronous signal forming the reference for spindle sync operations.

The programmable counter is configured to be reset by an external reset signal. In this case, the counter restarts count operations when the reset command is received. Owing to such operation, the synchronous generated by each unit can be synchronized with each other by executing the reset operations from a host device.

FIG. 17 shows a time chart explaining the relationship between a periodic signal and a reset signal in FIG. 16.

As illustrated in FIG. 17, when a reset signal corresponding to the reset command is sent from the external controller to each of the units, the synchronous signal (Carry1) and the reference signal becomes unsynronized, due to the reset operation in each of the units. However, when the timing of the synchronous signal of all the units A, B and the timing of the reference signal finally conform to each other, all the units are again synchronized. Consequently, Carry 1 can be generated at a constant period. Since such reset operations are performed in an extremely short time, the reset operations have no influence on the data transfer rate of the whole system.

FIG. 18 is a flow chart for explaining the sequence of performing a phase correction by utilizing the index signal of each unit in FIG. 16.

In this case, a sequential flow chart is separated into the first half and second half as illustrated in FIG. 10 (A) and FIG. 10(B), respectively.

Figure 18A:
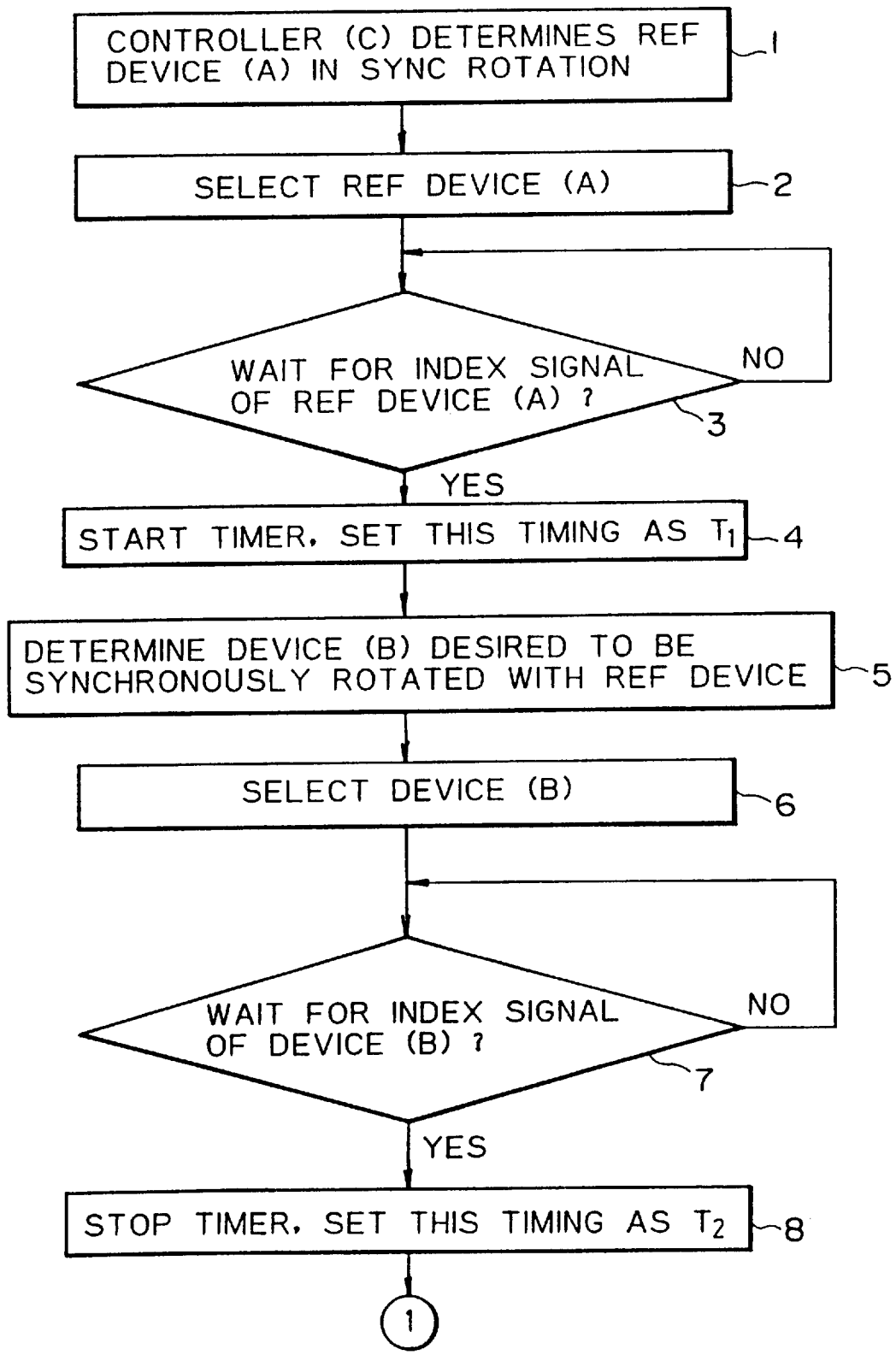
FIG. 18 is a flow chart for explaining the sequence of performing a phase correction by utilizing the index signal of each unit in FIG. 16.
Figure 18B:
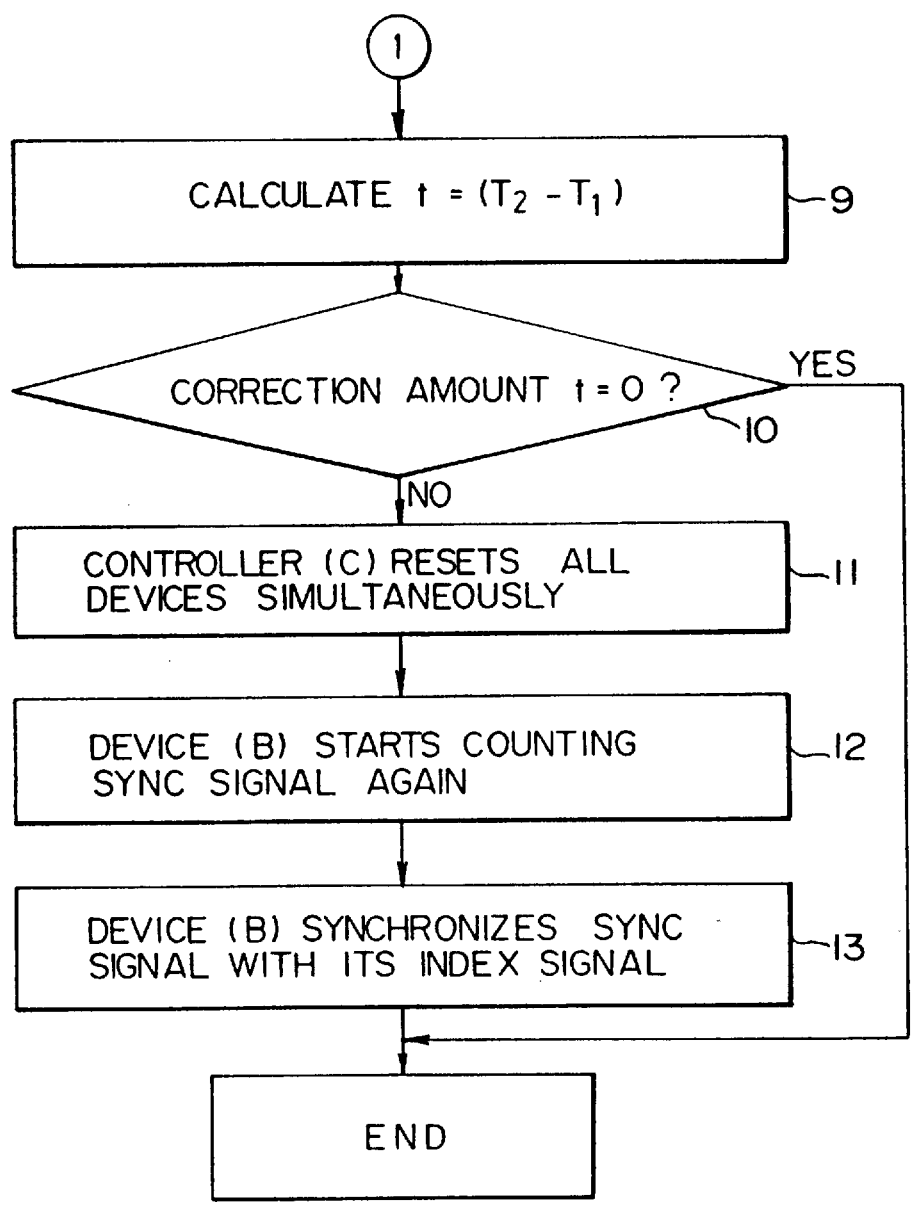

In FIG. 18(A) and FIG. 18(B), the sequence for attaining the rotation synchronous condition between the respective units by utilizing the reference signals (e.g., index signal) will be described. In this case, the above reference signals of the respective units are defined as the interface signal.

The sequence of performing a phase correction of FIG. 18 is similar to that of FIG. 10. However, as illustrated in the flow chart, steps 11, 12 of FIG. 18 are different from those of FIG. 10. To be more specific, in step 11, a controller sends a reset command to all the units at the same time. Further, in step 12, the unit B restarts the count operation for the synchronous signal and is operates to synchronize the reference signal with the synchronous signal.

Figure 19A:
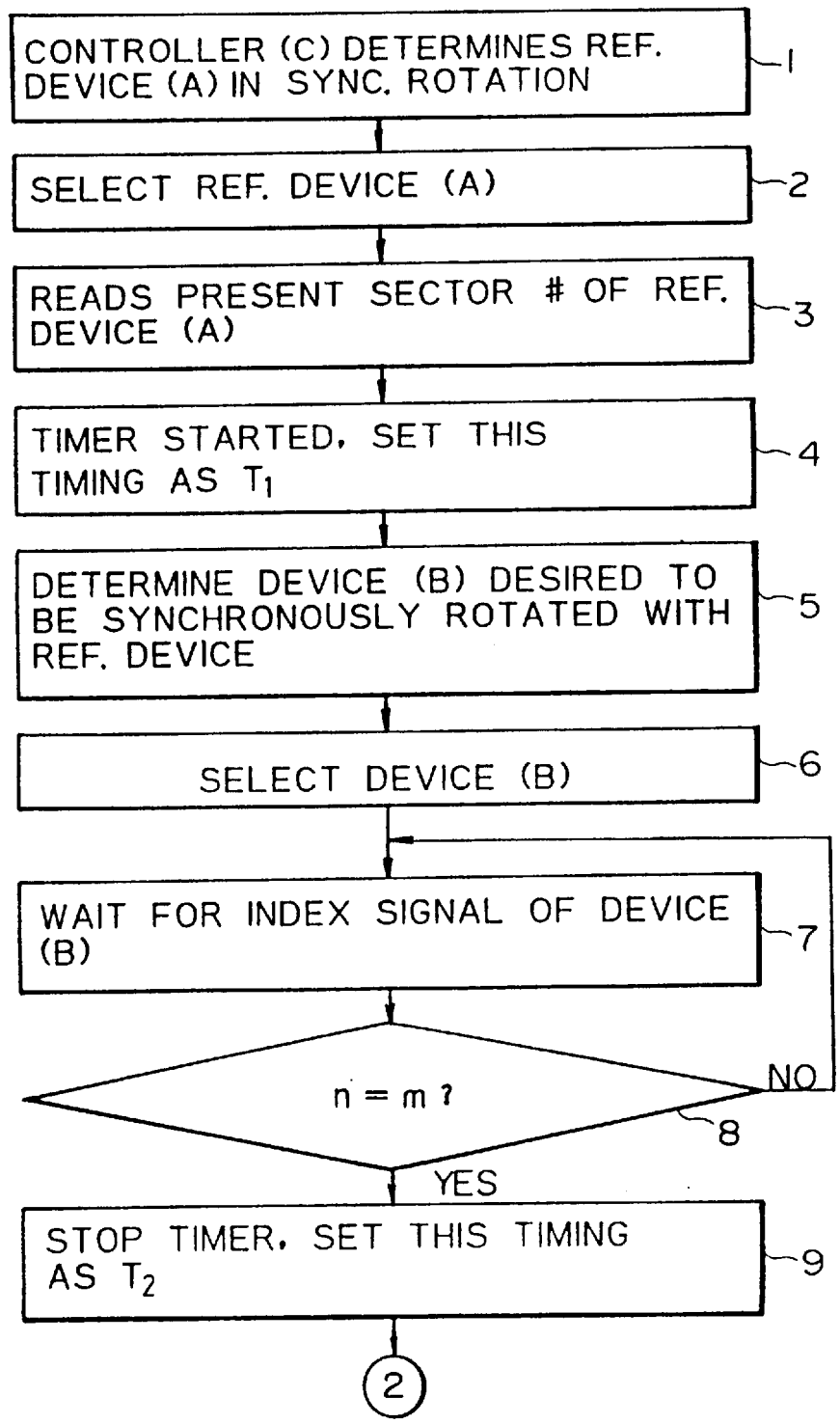
FIG. 19 is a flow chart for explaining the sequence of performing a phase correction by utilizing the second signal of each unit in FIG. 16.
Figure 19B:
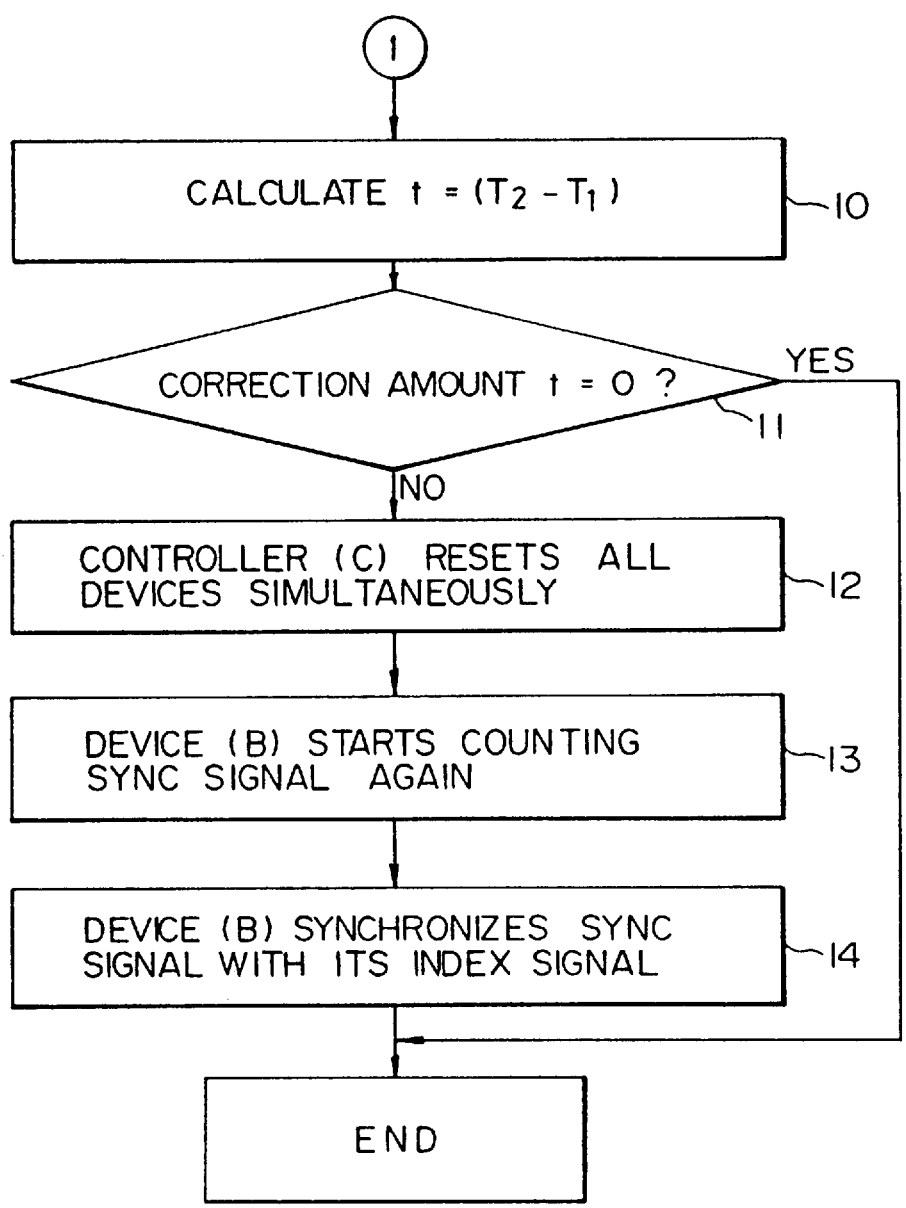

FIG. 19 is a flow chart for explaining the sequence of performing a phase correction by utilizing the sector signal of each unit shown in FIG. 16.

The sequence of performing a phase correction of FIG. 19 is similar to that of FIG. 11. However, as illustrated in the flow chart, step 11, 12 of FIG. 10 are different from those of FIG. 11. To be more specific, in step 12, the controller sends a reset command for all the units at the same time. Further, in step 13, similar to FIG. 18, the unit B restarts the count operation for the synchronous signal and operates to synchronize the reference signal with the synchronous signal.

The operations of phase correction as shown in FIG. 18 and FIG. 19 are especially effective when the reference unit is not prepared.

As described in the foregoing, the present invention has the following features:

(1) A plurality of controlled units can be kept in spindle sync without using any sync signal cables and connectors of these cables. Therefore, the system according to the present invention is not prone to failure caused by broken conductors in the cables or a poor connection of the connectors, and thus it has improved reliability.

(2) Since no sync signal cables or connectors are required failures due to inadvertent omission of such cables are not possible. Additionally, the spindle sync of all the controlled units is not lost for replacement of only one unit as in the conventional system.

(3) In case a new controlled unit is added to a group of controlled units currently used or when any one of the units currently used in a group is replaced with another unit, it is not necessary to connect a sync signal cable to the unit in consideration as in the conventional system. Thus, the addition or replacement of the unit can be done very easily. Also, the system reliability is improved.

(4) The spindle sync/reference signal source, phase adjuster, etc. provided in each controlled unit can be designed each a very small by utilizing various IC techniques. Thus, they can be mounted in a small magnetic disk drive.

I claim:

1. A rotation synchronous control system comprising:

a plurality of disk storage units, each of said disk storage units having means for outputting reference signals, and means for synchronizing a rotation of a disk with a rotation synchronous signal;

a host controller for issuing data commands to said disk storage units and for outputting said rotation synchronous signal based upon a selected reference signal output from one of said disk storage units; and an interface line connecting said host controller and each of said plurality of disk storage units for transmitting said data commands issued from said host controller to each of said plurality of disk storage units, for transmitting said reference signal to said host controller and for transmitting the output rotation synchronous signal to each of said plurality of disk storage units.

2. A rotation synchronous control system as set forth in claim 1, wherein said interface line comprises an interface cable.

3. A rotation synchronous control system as set forth in claim 2, wherein each of said disk storage units includes:

a rotation device controlled to rotate at a predetermined rotation speed;

rotation position detecting means for detecting a rotation position of said rotation device;

index signal generating means for generating an index signal based on a position detected by said detecting means;

sync signal generating means for generating a sync signal based on said predetermined rotation speed;

interface control means for outputting a reference signal based on said index signal; and phase adjusting means for adjusting a phase of said sync signal based on said rotation synchronous signal.

4. A rotation synchronous control system as set forth in claim 3, wherein said reference signals are generated in each of said plurality of units based upon said index signal.

5. A rotation synchronous control system as set forth in claim 4, wherein said phase difference measuring means determines one of said plurality of units to be a reference unit, and measures a phase difference between said reference signals output by said reference unit and each of the other units.

6. A rotation synchronous control system as set forth in claim 3, wherein said sync signal generating means is a sync reference signal source, and wherein said phase adjusting means is a phase adjuster.

* * * * *